United States Patent
Makino et al.

(10) Patent No.: US 8,023,743 B2
(45) Date of Patent: Sep. 20, 2011

(54) IMAGE PROCESSING APPARATUS AND IMAGE PROCESSING METHOD

(75) Inventors: Tetsuji Makino, Ome (JP); Yoshihiro Teshima, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 682 days.

(21) Appl. No.: 11/517,617

(22) Filed: Sep. 7, 2006

(65) Prior Publication Data

US 2007/0052818 A1  Mar. 8, 2007

(30) Foreign Application Priority Data

Sep. 8, 2005 (JP) ................................ 2005-261378

(51) Int. Cl.
| | |
|---|---|
| *G06K 9/48* | (2006.01) |
| *G06K 9/34* | (2006.01) |
| *G06K 9/46* | (2006.01) |
| *G06K 9/40* | (2006.01) |
| *G06K 9/42* | (2006.01) |
| *H04N 5/228* | (2006.01) |
| *H04N 5/235* | (2006.01) |
| *H04N 5/208* | (2006.01) |

(52) U.S. Cl. .................. 382/199; 348/222.1; 348/229.1; 348/252; 382/173; 382/190; 382/254; 382/256; 382/266

(58) Field of Classification Search .................. 382/167, 382/199, 173, 254, 256–272, 190; 348/222.1, 348/229.1, 252; 356/4.04; 345/173–179
See application file for complete search history.

(56) References Cited

U.S. PATENT DOCUMENTS

| | | | |
|---|---|---|---|
| 5,796,874 A | 8/1998 | Woolfe et al. | |
| 6,049,636 A | 4/2000 | Yang | |
| 6,298,157 B1 * | 10/2001 | Wilensky | ...................... 382/199 |
| 6,738,154 B1 | 5/2004 | Venable | |
| 6,771,838 B1 | 8/2004 | Fan | |
| 6,774,943 B1 * | 8/2004 | Kao et al. | ...................... 348/252 |
| 6,842,536 B2 | 1/2005 | Aihara | |
| 7,630,544 B1 * | 12/2009 | Zhou | ............................ 382/164 |

(Continued)

FOREIGN PATENT DOCUMENTS

EP    0 939 381 A1    9/1999

(Continued)

OTHER PUBLICATIONS

European Office Action (Communication pursuant to Article 96(2) EPC) for European Application No. 06 810 133-6-1224, dated Nov. 28, 2007. 5 pages.

(Continued)

*Primary Examiner* — Jason Chan
*Assistant Examiner* — Michael Osinski
(74) *Attorney, Agent, or Firm* — Holtz, Holtz, Goodman & Chick, PC

(57) ABSTRACT

When a user instructs photographing by operating an operating unit, an image captured by an image sensor is stored as a photographed image in a memory. When a mode for performing color fading correction is set, the CPU instructs an image processing device to extract, from the photographed image, areas in which there are photographic print images which are supposed to bring about color fading. The image processing device generates a binary image by detecting edges of the photographed image, erases edges contacting an outermost edge of the photographed image, and extracts the areas based on the binary image from which some of the edges are erased.

15 Claims, 16 Drawing Sheets

U.S. PATENT DOCUMENTS

| | | | |
|---|---|---|---|
| 7,869,651 B2* | 1/2011 | Makino | 382/167 |
| 2002/0164074 A1* | 11/2002 | Matsugu et al. | 382/173 |
| 2003/0164819 A1* | 9/2003 | Waibel | 345/173 |
| 2003/0174228 A1 | 9/2003 | Brake et al. | |
| 2004/0080670 A1* | 4/2004 | Cheatle | 348/441 |
| 2004/0101209 A1* | 5/2004 | Tanaka | 382/275 |
| 2004/0165786 A1* | 8/2004 | Zhang et al. | 382/276 |
| 2004/0202385 A1* | 10/2004 | Cheng et al. | 382/305 |
| 2005/0078879 A1* | 4/2005 | Sakurai et al. | 382/275 |
| 2005/0225648 A1 | 10/2005 | Lin et al. | |
| 2007/0053586 A1* | 3/2007 | Makino | 382/167 |

FOREIGN PATENT DOCUMENTS

| | | |
|---|---|---|
| GB | 2 386 785 A | 9/2003 |
| JP | 10-276317 A | 10/1998 |
| JP | 2002-101313 A | 4/2002 |
| JP | 2002-166393 A | 6/2002 |
| JP | 2002-197449 A | 7/2002 |
| JP | 2002-287270 A | 10/2002 |
| JP | 2002-354331 A | 12/2002 |
| KR | 2005-0082256 A | 8/2005 |
| TW | 525374 B | 3/2003 |
| TW | 239209 B | 9/2005 |

OTHER PUBLICATIONS

De Polo A Ed—Skodras A N et al: "Digital picture restoration and enhancement for quality archiving" Digital Signal Processing, 2002. DSP 2002. 2002 14$^{th}$ International Conference on Santorini, Greece Jul. 1-3, 2002, Piscataway, NJ, USA, IEEE, US, vol. 1, Jul. 1, 2002, pp. 99-102, XP010599695, ISBN: 0-7803-7503-3.

Changhua Wu et al: "Document image de-warping for text/graphics recognition" Structural, Syntactic, and Statistical Pattern Recognition, Joint IAPR International Workshops SSPR 2002 and SPR 2002 (Lecture Notes in Computer Science vol. 2396) Springer-Verlag Berlin, Germany, 2002, pp. 348-357, XP007901727, ISBN: 3-540-44011-9.

Korean Office Action (and English translation thereof) dated Sep. 17, 2008, issued in a Korean Application corresponding to related U.S. Appl. No. 11/517,613.

Related U.S. Appl. No. 11/517,613, filed Sep. 7, 2006; Inventor: Tetsuji Makino, Title: Image Processing Apparaus and Image Processing Method.

Taiwanese Office Action dated Jul. 30, 2009 (9 pages), and English translation thereof (11 pages), issued in counterpart Taiwanese Application Serial No. 095133053.

Non-final Office Action dated Mar. 1, 2010 (13 pages), issued in related U.S. Appl. No. 11/517,613.

Taiwanese Office Action dated Apr. 30, 2010 and English translation thereof, issued in Taiwanese Application No. 095133053, which is a Taiwanese counterpart of related U.S. Appl. No. 11/517,613.

Japanese Office Action dated Jan. 26, 2010 and English translation thereof issued in a counterpart Japanese Application No. 2005-261378.

Japanese Office Action dated Jan. 26, 2010 and English translation thereof issued in a counterpart Japanese Application No. 2005-261377 of related U.S. Appl. No. 11/517,613.

Taiwanese Office Action dated Feb. 24, 2010 and English translation thereof in counterpart Taiwanese Application No. 095133054.

* cited by examiner

IMAGE PROCESSING APPARATUS AND IMAGE PROCESSING METHOD

CROSS-REFERENCE TO RELATED APPLICATIONS

This application is based upon and claims the benefit of priority from prior Japanese Patent Application No. 2005-261378, filed Sep. 8, 2005, the entire contents of which are incorporated herein by reference.

BACKGROUND OF THE INVENTION

1. Field of the Invention

The present invention relates to an image processing apparatus and an image processing method which extract a predetermined area (a photographic print or the like) from a photographed image.

2. Description of the Related Art

In recent years, digital cameras have been popularized as a photographing device, and digitization of photographs has been in progress.

Digitization of photographs has a variety of advantages. For example, photographs can be compactly stored, it is easy to copy photographs, and photographs can be browsed in a variety of ways such as in succession or in random order. From the standpoint of such advantages, digitization of conventional photographs obtained by using silver salt films will be widely used. Because digital cameras have been popularized recently, many people have such conventional photographs. The conventional photographs include photographs on printing papers and developed films. Hereinafter, those are generally referred to as "photographic prints".

Photographic prints can be digitized by, for example, causing a flatbed scanner to scan the photographic prints. As is commonly known, the original colors of photographic prints discolor (fade) due to chemical change as time passes. For this reason, some scanners have an image processing device, which performs color fading correction for correcting discoloration, mounted thereon.

An example of a conventional image processing device which performs color fading correction is described in Jpn. Pat. Appln. KOKAI Publication No. 2002-101313. The conventional image processing device described this Patent Document detects a level of color fading of an acquired image, and performs color fading correction according to the result of the detection. The level detection makes it possible to appropriately perform color fading correction by merely acquiring an image.

It is necessary to apply the level detection only to images to be objects of color fading correction. Otherwise, it is impossible to precisely identify how color fading occurred on the images. As is commonly known, a flatbed scanner is caused to scan a scanning object which is directly placed on a scanning table, or is set on a feeder. Therefore, it is possible to easily scan only a photographic print to which color fading correction is to be applied.

By the way, photographic prints are generally attached to an album or the like (here, including a method for putting photographic prints into a file at least one side of which is transparent). Photographic prints affixed to the album cannot be set on a feeder. Moreover it is difficult to set them appropriately on a scanning table. It is ordinary impossible to scan only a target photographic print affixed to an album. For this reason, photographic prints affixed to an album are generally removed from the album when it is scanned. Consequently, when a scanner is caused to scan photographic prints, it is necessary to carry out the following burdensome works for each photographic print. That is, a photographic print is removed from the album, and is placed on a scanning table, and after scanning is completed, the photographic print on the scanning table is affixed to the album again.

Photographic prints may be damaged at the time of being removed from the album. For example, when the photographic prints are stuck to a clear sheet covering photographic prints in the album, there is a high possibility of damaging them. Therefore, it is desirable to scan the photographic prints without removing them from the album.

It is possible to scan photographic prints without removing them from album using the invention described in Jpn. Pat. Appln. KOKAI Publication No. 2002-354331. However, it is more convenient and preferable for a user to be able to use a portable photographing device such as a digital camera. With a portable photographing device, it is possible to photograph an object in an arbitrary positional relationship. The advantage that the object can be photographed in an arbitrary positional relationship means, on the other hand, that it is difficult to know under what photographic condition (a positional relationship with a photographing device and an object, a positional relationship with the object and another object, and the like) a photographic print has been actually photographed. This makes it difficult to recognize a specific photographic print.

Moreover, an album generally stores many photographic prints. It has been difficult to precisely recognize a target of color fading correction from among these many photographs.

BRIEF SUMMARY OF THE INVENTION

An object of the present invention is to provide an image processing apparatus and an image processing method which extract a predetermined image area from a photographed image.

According to an embodiment of the invention, an image processing apparatus comprises:

an image capturing unit which captures an image of an object which includes a photograph;

an edge detecting unit which detects edges existing in the image of the object captured by the image capturing unit;

a weighting unit which performs weighting onto the edges detected by the edge detecting unit depending on whether or not the edges contact an outermost edge of the image of the object; and an area extracting unit which extracts an area in which the photograph exists from the image of the object based on the edges subjected to weighting by the weighting unit.

According to another embodiment of the invention, an image processing method comprises:

a step of capturing an image of an object includes a photograph;

a step of detecting edges existing in the captured image of the object;

a step of performing weighting onto the edges detected by the step of detecting edges depending on whether or not the edges contact an outermost edge of the image of the object; and a step of extracting an area in which the photograph exists from the image of the object based on the edges subjected to weighting by the step of performing weighting.

According to another embodiment of the invention, a computer program product being stored in a computer usable medium, the computer program product configured to store program instructions for execution on a computer system enabling the computer system to perform:

capturing an image of an object includes a photograph;

detecting edges existing in the captured image of the object;

performing weighting onto the detected edges depending on whether or not the edges contact an outermost edge of the image of the object; and extracting an area in which the photograph exists from the image of the object based on the edges subjected to weighting.

DETAILED DESCRIPTION OF THE INVENTION

Hereinafter, embodiments of the present invention will be described in detail with reference to the drawings.

First Embodiment

Figure 1:
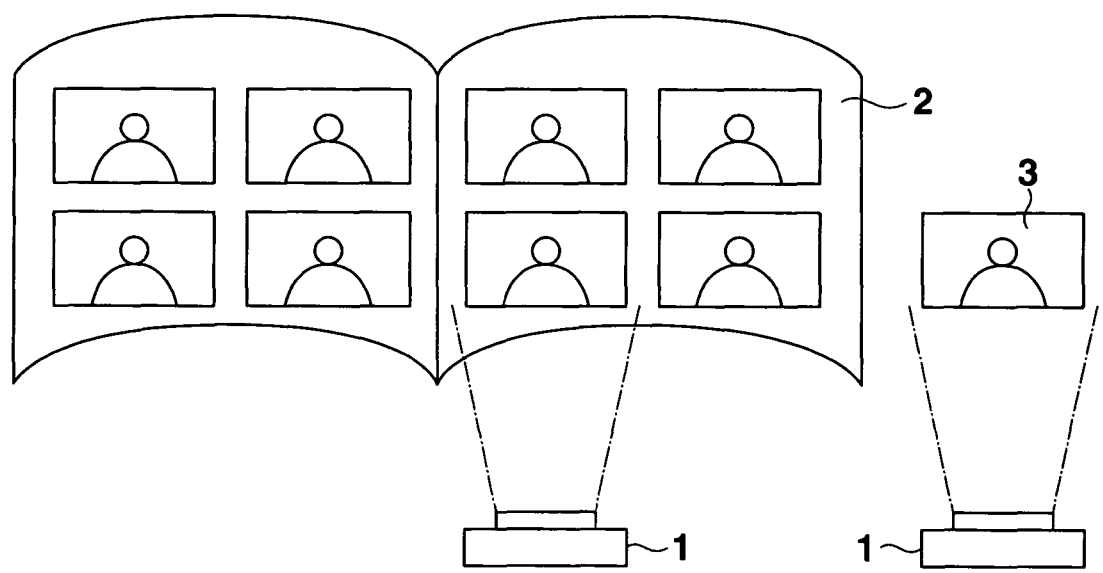
FIG. 1 is a diagram for explanation of a photographing device including an image processing apparatus according to the first embodiment.

FIG. 1 is a diagram for explanation of a photographing device including an image processing apparatus according to the first embodiment. A photographing device 1 is assumed to be a portable one, such as a digital camera or a cellular phone having camera function. An object 2 is an album for storing photographic prints 3 which are developed films or photographs on printing papers, as described above. Hereinafter, reference numeral 2 refers to only the album to be an object.

Figure 2:
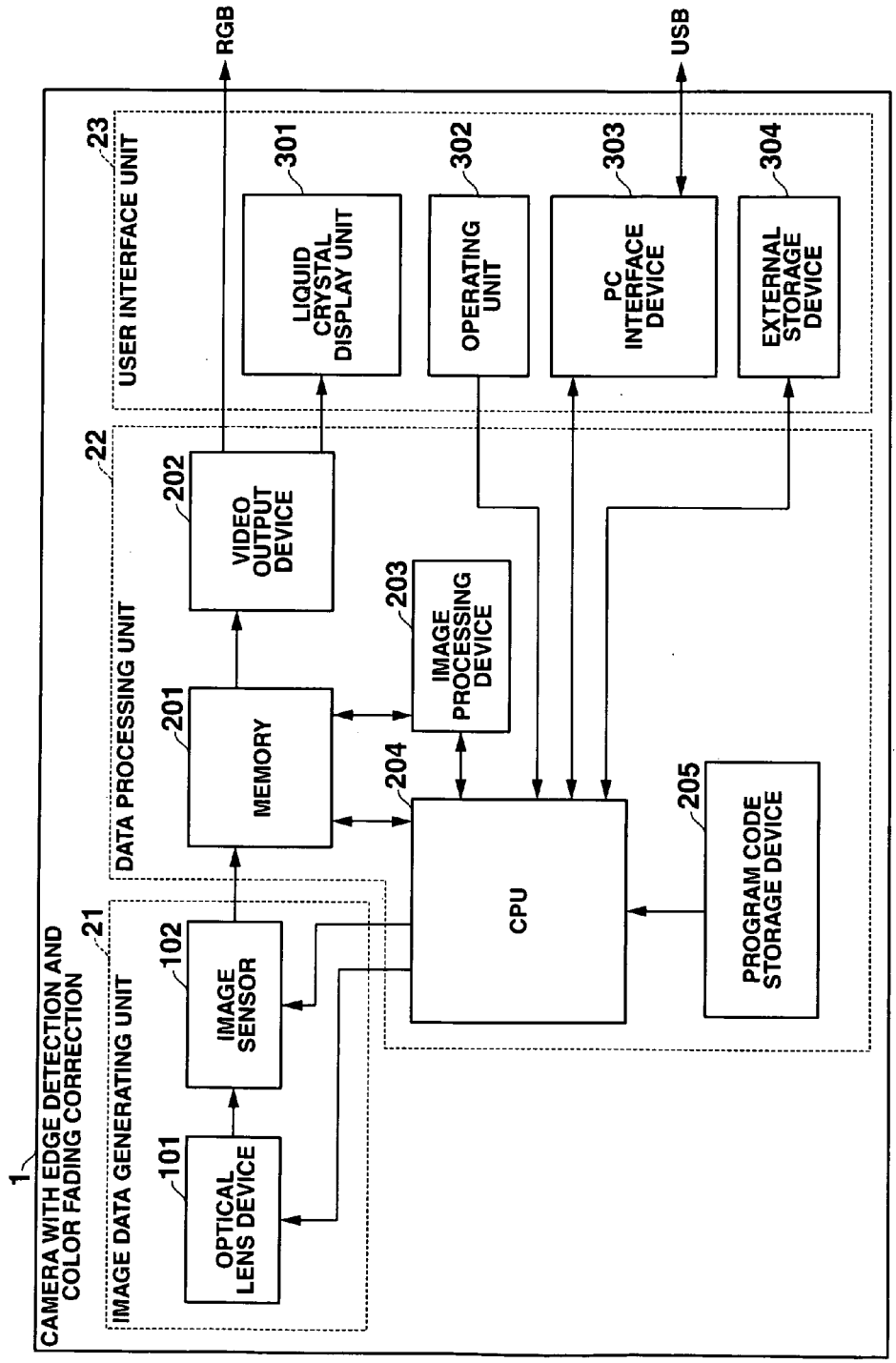
FIG. 2 is a diagram for explanation of a configuration of the photographing device including the image processing apparatus according to the first embodiment.

FIG. 2 is a diagram for explanation of a configuration of the photographing device 1. As shown in FIG. 2, the photographing device 1 includes an image data generating unit 21 for generating image data obtained by digitizing an image obtained by photographing a photographing target object; a data processing unit 22 for performing image processing onto image data; and a user interface unit 23 for exchange information with users.

The image data generating unit 21 includes an optical lens device 101 and an image sensor 102. The optical lens device 101 constitutes an optical system which forms an image of an object on the image sensor 102, and can adjust setting parameters on photographing such as a focal point, an exposure, and a white balance. The image sensor 102 transforms the image of an object which is focused/imaged by the optical lens device 101 into digitized image data. The image sensor 102 is constituted by a CCD or the like.

The image data generating unit 21 performs high-resolution image photographing and low-resolution image photographing (preview photographing). In the low-resolution image photographing, an image resolution is, for example, about XGA (extended Graphics Array: 1024×768 dots) which is relatively low. However, it is possible to perform video recording or image reading at a speed of about 30 fps (frames/second). On the other hand, in the high-resolution image photographing, photographing is performed at, for example, a photographable maximum number of pixels (dots). Since photographing is performed at the maximum number of pixels, photographing speed and image reading speed are slow in comparison with those in the case of the low-resolution image photographing.

The data processing unit 22 includes a memory 201 which stores image data output from the image sensor 102; a video output device 202 for displaying the image data stored in the memory 201; an image processing unit 203 for performing image processing onto the image data; a CPU 204 which controls the entire photographing device 1; and a program code storage device (hereinafter abbreviated as "code storage device") 205 which stores programs (program codes) executed by the CPU 204. The storage device 205 is, for example, a ROM or a flash memory. The image processing apparatus according to the present embodiment is realized as the image processing device 203.

The user interface unit 23 includes a liquid crystal display unit 301, an operating unit 302 including various operational parts, a PC interface device 303 for performing input/output of data to/from an external device such as a personal computer (PC), and an external storage device 304.

The operating unit 302 includes, as the operational parts, for example, a power key, mode change-over switches, a shutter key, a menu key, arrow keys, a focus key, and a zoom key, which are not illustrated. The mode change-over switches include a switch for switching modes of recording (photographing)/playback, and a switch for switching sub-modes in normal/color fading correction (hereinafter, the latter is transcribed into "sub-mode change-over switch" to be distinguished). Though not shown, a sub-CPU is also provided which detects a change of state of the switches and transmits a detection signal corresponding to the change to the CPU 204. The external storage device 304 is, for example, a portable storage medium (for example, a flash memory) which can be attached to and detached from the apparatus 1, or a hard disk device.

The CPU 204 controls the entire photographing device 1 by loading and executing programs stored in the code storage device 205. The CPU 204 controls the optical lens device 101 or the image sensor 102 of the image data generating unit 21 as needed according to a command signal input from the operating unit 302, thereby adjusting a focal point, a white balance and the like, or changing an exposure time.

When the recording mode is set, the CPU 204 causes the image sensor 102 to output image data even before shooting. The video output device 202 generates, from image data stored in the memory 201, RGB signals to display, and outputs the generated signals to the liquid crystal display unit 301. In this manner, the liquid crystal display unit 301 can display an image of a photographing object or a photographed image. The RGB signals from the video output device 202 can be output to an external device via terminals (not shown) such that the RGB signals can be displayed by a television, a PC, a projector, or the like.

The image data stored in the memory 201 is saved in such a manner that the CPU 204 stores the image data in the format of file into the external storage device 304. The image data stored in the external storage device 304 can be output via the PC interface device 303. The PC interface device 303 is compliant with, for example, USB.

The CPU 204 instructs the image processing device 203 to perform image processing to apply onto the image data as needed. When the image data are saved in the external storage device 304, the CPU 204 causes the image processing device 203 to perform compression processing. When the playback mode is set, the CPU 204 loads to the memory 201 the image data encoded by compression processing to be saved in the external storage device 304, in accordance with an operation to the operating unit 302. Then the CPU 204 causes the image processing device 203 to perform decompression processing to display the image data on the liquid crystal display unit 301.

As described above, in the recording mode, the normal mode or the color fading correction mode can be set as a sub-mode. The normal mode is a mode for loading a shot image as it is. The color fading correction mode is a mode for performing color fading correction by automatically extracting an image area having an object, which is assumed that the original color has faded to discolor (color-fade). The color fading correction mode is prepared so that digitization can be appropriately performed in a state which the photographic prints 3 are affixed to the album 2 or the like (i.e., without removing them from the album 2 or the like). When the color fading correction mode is set, the CPU 204 causes the image processing device 203 to perform following image processing. An object of the image processing is image data obtained by photographing. The "image data obtained by photographing" is hereinafter called "photographed image data" or "original image data" in order to distinguish them from image data stored in the memory 201 before photographing. An image expressed by the data is called a "photographed image" or an "original image".

The image processing mainly includes (1) edge detection, (2) oblique photographing correction, (3) color fading level detection onto an edge-detected area, and (4) color fading correction. The edge detection processing is for detecting edge (boarder lines) of an image of a photographic print 3 (photographic print image) included in a photographed image of the object 2. A photographic print image is generally distorted more or less due to the state of the photographic print 3 or a positional relationship with respect to a camera. Even if the photographic print 3 is completely flat, the photographic print image is distorted unless the surface thereof is in a positional relationship perpendicular to the optical axis of the optical system constituted by the optical lens device 101 (hereinafter called an "ideal positional relationship"), i.e., when the photographic print 3 is photographed from an oblique direction. The oblique photographing correction processing is for correcting distortion.

A chemical change occurs in the photographic print 3 in accordance with a condition of preservation, i.e., humidity, temperature, ultraviolet, or the like, and the photographic print 3 discolors so as to fade away in its original color, which causes color fading. The color fading level detection processing onto edge-detected area is for detecting a level of color fading (color fading level) on a photographic print image (edge-detected area) subjected to the oblique photographing correction processing. The color fading correction processing is for performing color fading correction to a photographic print image for approximating a color changed by color fading to an original color in accordance with a color fading level specified by the color fading level detection processing.

Next, the above-described various image processing executed by the image processing device 203 will be described in detail. The image processing device 203 performs the various image processing using the memory 201, which stores photographed image data, as a work area. Programs for performing the image processing are stored in a nonvolatile memory contained in the image processing device 203, or the code storage device 205 accessed by the CPU 204. Here, the latter is assumed. In this case, the CPU 204 loads programs for the various image processing from the code storage device 205 and transfer the programs to the image processing device 203 if necessary.

FIGS. 3A to 3G are diagrams for explanation of an edge detection method in the edge detection processing.

Figure 3A:
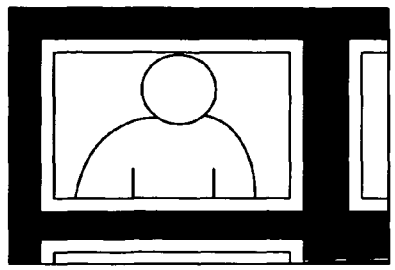
FIGS. 3A, 3B, 3C, 3D, 3E, 3F, and 3G are diagrams for explanation of an edge detection method.
Figure 3B:
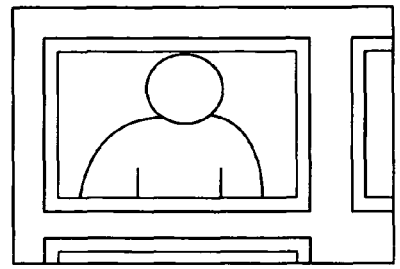

A preview image shown in FIG. 3A is a photographed image whose image data is stored in the memory 201 by photographing the photographic print 3 in the album 2. A binary edge image as shown in FIG. 3B is created by performing edge detection onto the preview image. The creation is carried out by using, for example, a filter for edge detection, which is called Roberts filter.

In this Roberts filter, two difference values Δ1 and Δ2 are determined by performing two types of weighting onto four adjacent pixels consisted of a target pixel and three pixels adjacent thereto, and the difference values are averaged to calculate a pixel value of the target pixel so as to emphasize the edge. Assuming that the coordinates at which the target pixel is positioned are (x, y), and the pixel value is f(x, y), a pixel value g(x, y) after filtering process by a Roberts filter (after transform) is expressed as follows.

$$g(x, y) = \sqrt{(\Delta 1)^2 + (\Delta 2)^2} \quad (1)$$

$$\Delta 1 = 1 \cdot f(x, y) + 0 \cdot f(x+1, y) + 0 \cdot f(x, y-1) - 1 \cdot f(x+1, y-1)$$

$$= f(x, y) - f(x+1, y-1)$$

$$\Delta 2 = 0 \cdot f(x, y) + 1 \cdot f(x+1, y)$$

$$= 1 \cdot f(x, y-1) + 0 \cdot f(x+1, y-1)$$

The pixel value g(x, y) obtained by formula (1) is biharized according to a predetermined threshold value TH. The threshold value TH may be determined to be a fixed value. However, it may be determined as needed by a method such as a variable threshold method or a discrimination analysis method. The pixel value g(x, y) is transformed into a binary pixel value h(x, y) by the following formula using the threshold value TH. A binarized image (binary edge image) h, as shown in FIG. 3B, which expresses an edge extracted on the photographed image is created (generated) by the transform.

$$h(x, y) = \begin{cases} 1 & \text{when } g(x, y) \geq TH \\ 0 & \text{when } g(x, y) < TH \end{cases} \quad (2)$$

There is a possibility that a color of a place on which the photographic print 3 is placed (background) is similar to a color of the periphery of the photographic print 3. Specifically, that is a case, for example, in which the photographic print 3 having a blue sky background is affixed to a blue color sheet. Even in such a case, it is possible to emphasize a difference between the photographic print 3 and the blue color sheet, when a format of the image data is YUV, for example, by following formula. As in the following formula, difference values of, not only a luminance value Y, but also differences U and V of the each color component are respectively determined and averaged. Then, an averaged value is multiplied by a coefficient n, and it is added to the averaged value determined with respect to the luminance value Y.

$$g(x, y) = \sqrt{(\Delta Y1)^2 + (\Delta Y2)^2} + \sqrt{(\Delta U1)^2 + (\Delta U2)^2} + \sqrt{(\Delta V1)^2 + (\Delta V2)^2} \times n \quad (3)$$

$$\Delta Y1 = 1 \cdot fy(x, y) + 0 \cdot fy(x+1, y) + 0 \cdot fy(x, y-1) - 1 \cdot fy(x+1, y-1)$$
$$= fy(x, y) - fy(x+1, y-1)$$
$$\Delta Y2 = 0 \cdot fy(x, y) + 1 \cdot fy(x+1, y) - 1 \cdot fy(x, y-1) + 0 \cdot fy(x+1, y-1)$$
$$= fy(x+1, y) - fy(x, y-1)$$
$$\Delta U1 = 1 \cdot fu(x, y) + 0 \cdot fu(x+1, y) + 0 \cdot fu(x, y-1) - 1 \cdot fu(x+1, y-1)$$
$$= fu(x, y) - fu(x+1, y-1)$$
$$\Delta U2 = 0 \cdot fu(x, y) + 1 \cdot fu(x+1, y) - 1 \cdot fu(x, y-1) + 0 \cdot fu(x+1, y-1)$$
$$= fu(x+1, y) - fu(x, y-1)$$
$$\Delta V1 = 1 \cdot fv(x, y) + 0 \cdot fv(x+1, y) + 0 \cdot fv(x, y-1) - 1 \cdot fv(x+1, y-1)$$
$$= fv(x, y) - fv(x+1, y-1)$$
$$\Delta V2 = 0 \cdot fv(x, y) + 1 \cdot fv(x+1, y) - 1 \cdot fv(x, y-1) + 0 \cdot fv(x+1, y-1)$$
$$= fv(x+1, y) - fv(x, y-1)$$

In formula (3), there are sums of squares of the three components as shown below. The transform with the Roberts filter is performed for edge extraction. Because it is sufficient to extract edge, a pixel value g(x, y) may be calculated by using only a maximum one among the sums of squares of the three components.

$$\begin{cases} (\Delta Y1)^2 + (\Delta Y2)^2 \\ (\Delta U1)^2 + (\Delta U2)^2 \\ (\Delta V1)^2 + (\Delta V2)^2 \end{cases}$$

The above-mentioned emphasis can be performed even if the image data is in another format. When the image data is in a format for expressing the colors with RGB, pixel values g(x, y) are respectively determined by formula (I) with respect to the each RGB component, and a maximum one thereamong is applied, which enables the emphasis. This is the same as in a case in which the image data is in a format for expressing the colors with CMY or CMYK.

To shoot a photographic print 3 affixed to an album 2, when there are other photographic prints 3 in the vicinity of the photographic print 3, as shown in FIG. 3B, the photographic print 3 can be likely photographed together with other photographic prints. However, a user wishes to shoot the photographic print 3 desired to digitize (hereinafter, when there is other photographic prints to be distinguished, as a matter of convenience, it is called a "desired photographic print", and an image thereof is called a "desired photographic print image") trying so that the desired photographic print 3 show up larger, while trying not to generate portions which are not shown up, in order to carry out digitization more preferably. As a consequence, as shown in FIG. 3B, the entire desired photographic print 3 is shown up near the center of the photographed image, and even if the other photographic prints 3 are shown up, only a portion thereof will be shown up at the periphery in most cases.

Edges may also exist within the desired photographic print image as shown in FIG. 3B. In order not to erroneously detect the edge within the desired photographic print image, it is desired that an outer edge is detected with a higher priority. It is called "outer edge priority".

Figure 3C:
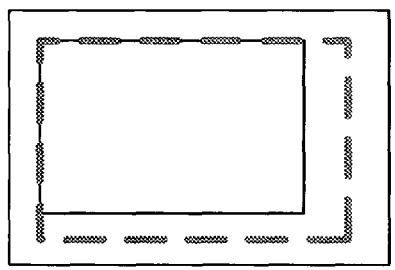
Figure 3D:
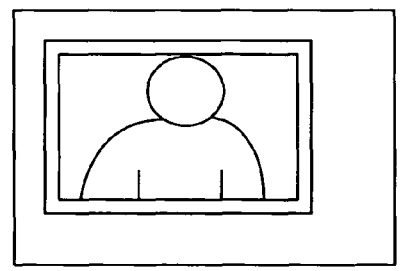
Figure 3E:
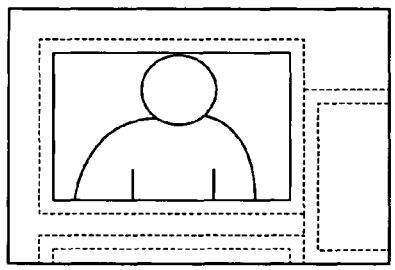
Figure 3F:
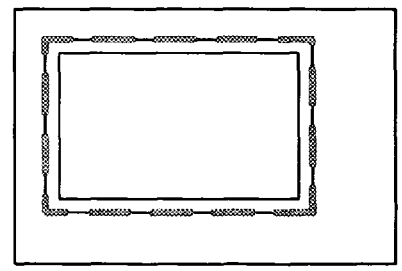

However, if there are other photographic print images are included in the periphery of the photographed image, employing the outer edge priority may lead to a fact that the edges of the other photographic print images are erroneously detected as the edge of the desired photographic print image, as shown in FIG. 3C. In order to avoid such erroneous detection, in the present embodiment weighting is performed so as to operate the edge in accordance with whether or not the edge contacts an edge of the photographed image. Hereinafter it is called an "outermost edge"). More specifically, edge contact the outermost edge is erased from the binary edge image. The edge image shown in FIG. 3B is updated as shown in FIG. 3D by the outermost edge erasure. In such a way, even if other photographic print images exist, edges of the other photographic print images are erased, so that it is possible to certainly detect an area where the desired photographic print image exists as shown in FIG. 3F.

The erasure of edge contacting the outermost edge may be performed by using a labeling method. The pixels which are connected to one another and have at least one pixel contacting the outermost edge are erased.

Figure 4:
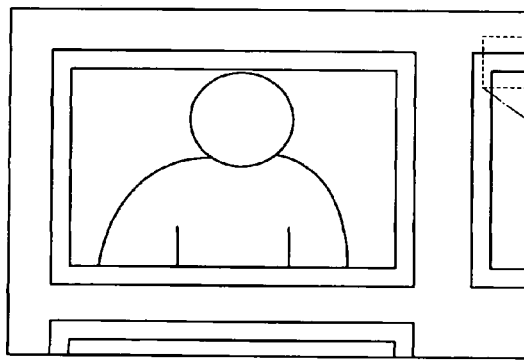
FIG. 4 is a diagram for explanation of assignment of labels by a labeling method.

In a case of a binary image such as a binary edge image, labeling is performed in such a manner that, as shown in FIG. 4, when a target pixel F(x, y) is on the edge, peripheral 8 pixels connecting with the target pixel are examined, and a same label as that of the target pixel F(x, y) is assigned to pixels which are connected to the target pixels F(x, y). By assigning labels in this way, the same label is assigned to all the pixels connected with one another to constitute an edge. For this reason, the edge contacting the outermost edge is erased by canceling assignment of labels to the pixels constituting the edge contacting the outermost edge. Further, values of the pixels from which assignment of labels has been cancelled are made to be zero.

Detection of straight lines forming the edge of the desired photographic print image is performed on a binary edge image (hereinafter abbreviated as "edge image") which has been updated by the above erasing processing. Detection is performed by using the Hough transform.

Figure 6A:
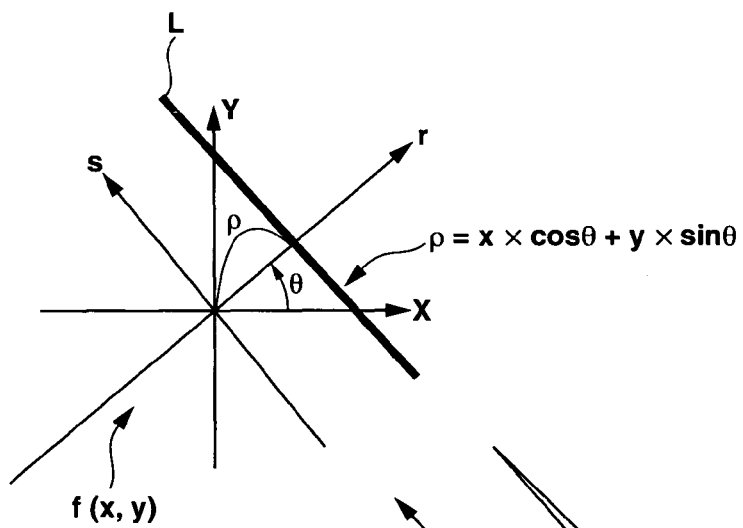
FIGS. 6A and 6B are diagrams for explanation of Hough transform.
Figure 6B:
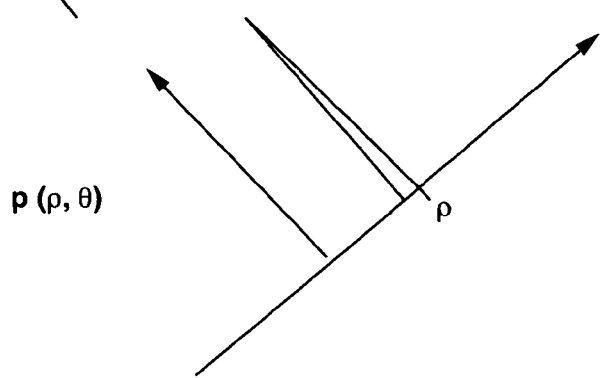

The Hough transform is, as shown in FIGS. 6A and 6B, a transform technique in which numbers of points constituting a straight line on an X-Y plane are "voted" on a ρ-θ plane expressed by the following formula, and are transformed into a number of votes on the ρ-θ plane.

$$\rho = x \cdot \cos\theta + y \cdot \sin\theta \quad (4)$$

When an angle θ is changed from 0° to 360° at the coordinates (x, y) of the respective points, the same straight line is represented by the same point on the ρ-θ plane. This is because, when there is a straight line passing through the coordinate point separated from the origin by the distance ρ, votes of the respective points constituting the straight line are performed onto the same point on the ρ-θ plane. Therefore, it is possible to specify the straight line (a position thereof) based on the ρ-θ coordinates at which a larger number of votes are obtained. The number of votes obtained equals to the number of pixels on the straight line, which can be regarded as a length of the straight line. Consequently, ρ-θ coordinates with a large number of votes are regarded as a short straight line or a curved line, and are counted out from candidates represent the outermost edge of the photographic print image.

In the edge image serving as an examination object, considering the center of the image as the origin of the coordination system, both the two terms at the right-hand side of formula (4) take positive and negative values. For this reason, a value of the distance p is positive within a range in which the angle θ is 0°≦θ<180°, and is negative within a range in which the angle θ is 180°≦θ<0°) (360°).

The color fading correction mode is, as described above, assumed to be used for digitization of the photographic print 3 already exists. Under the assumption, as described above, there are many cases in which the photographic print 3 is shot under the condition that an image comes out more significantly, near the center of the photographed image. In a case of photographing in such a way, the center of the photographic print image (a rectangular image area) is positioned near the center (the origin) of the photographed image, and the respective borders (sides) exist on the top, bottom, left, and right of the origin. Accordingly, the number of votes obtained on the ρ-θ plane can be more efficiently detected by dividing the detection range with respect to angle θ into ranges as follows than by dividing into ranges of 0°≦θ<180° and 180°≦θ<0° (360°).

Borders (sides) of the top and bottom $$45° \leq \theta < 135° \text{ (or } 225° \leq \theta < 315°) \quad (5)$$

Borders (sides) of the left and right $$135° \leq \theta < 225° \text{ (or } 315° \leq \theta < 405°) \quad (6)$$

In accordance with the limits to the ranges of the angle θ and a positive or negative value of the distance ρ, the top and bottom or the left and right of the borders can be specified, and intersecting points can be calculated to become vertexes of the photographic print image. From the photographing condition assumed as described above, the borders of the photographic print image may not be close to the origin. For this reason, in specification of candidates corresponding to the borders among the candidates for straight lines with a large number of votes, the distance ρ is to be considered.

An image area where there is a photographic print image is specified as an edge-detected area by specifying the four borders. After the edge-detected area is specified, oblique photographing correction processing is applied to the area. In the correction processing, the specified area (photographic print image) is extracted (clipped out) from the photographed image to correct distortion. The correction is performed with projective transformation. In the present embodiment, the transform is performed by use of two-dimensional affine transformation without using three-dimensional camera parameters. The affine transformation is, as is commonly known, widely applied to spatial transform for images.

In affine transformation, operations of shifting, scaling, rotating, and the like are performed according to the following formula to coordinates (u, v) before the transformation, and coordinates (x, y) after the transformation are determined.

$$(x', y', z') = (u, v, 1) \begin{pmatrix} a_{11} & a_{12} & a_{13} \\ a_{21} & a_{22} & a_{23} \\ a_{31} & a_{32} & a_{33} \end{pmatrix} \quad (7)$$

The conclusive coordinates (x, y) are calculated as follows.

$$x = \frac{x'}{z'} = \frac{a_{11}u + a_{21}v + a_{31}}{a_{13}u + a_{23}v + a_{33}} \quad (8)$$

$$y = \frac{y'}{z'} = \frac{a_{12}u + a_{22}v + a_{32}}{a_{13}u + a_{23}v + a_{33}}$$

Formula (8) is a formula for performing projective transformation, and the coordinates (x, y) degenerate toward 0 in accordance with a value of z'. Namely, parameters included in z' have an effect on projections. The parameters are a13, a23, and a33. Further, because other parameters can be normalized by the parameter a33, a value of the parameter a33 may be 1. The respective parameters of the 3×3 matrix at the right-hand side of formula (7) can be calculated based on the edge (four vertexes) of the edge-detected area and a focal length at the time of photographing.

Figure 7:
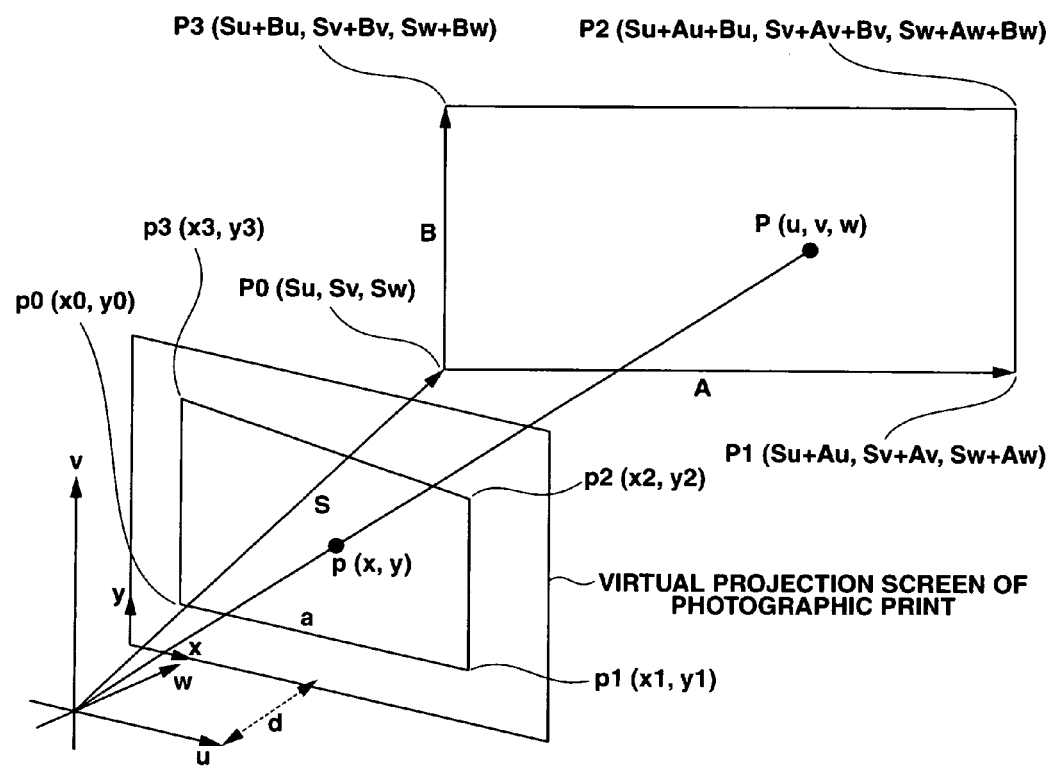
FIG. 7 is a diagram for explanation of a relationship between a photographic print and a projected image of the photographic print.

FIG. 7 is a diagram for explanation of a relationship between a photographic print image in a photographed image and an image of the photographic print.

In FIG. 7, a U-V-W coordination system is a three-dimensional coordination system of the photographed image (original image) obtained through photographing by the image data generating unit 21. An A($A_u$, $A_v$, $A_w$) vector and a B($B_u$, $B_v$, $B_w$) are vectors representing the photographic print 3 on the three-dimensional U-V-W coordination system. Further, an S($S_u$, $S_v$, $S_w$) is a vector indicates a distance between the origin of the U-V-W coordination system and the photographic print 3.

A virtual projection screen (hereinafter "virtual screen") of the photographed image shown in FIG. 7 virtually indicates an image projected by the photographing device 1. This is to perform projection of a photographic print image. Assuming that the virtual screen is an X-Y coordination system, an image of the photographic print 3 projected on the virtual screen corresponds to a photographic print image to be photographed. Here, it is assumed that the virtual screen is arranged so as to be away from a plane passing through W=0 by a distance d, and to be perpendicular thereto.

Suppose that an arbitrary point P(u, v, w) on the photographic print 3 and the origin are connected by a straight line, and the X-Y coordinates of an intersecting point at which the straight line and the virtual screen intersect are p(x, y). In this case, the coordinate p is expressed by the following formula with projective transformation.

$$\begin{cases} x = u\dfrac{d}{w} \\ y = v\dfrac{d}{w} \end{cases} \quad (9)$$

From formula (9), a relational expression shown below can be obtained from a relationship, as shown in FIG. 7, between four vertexes P0, P1, P2 and P3 and projected points p0, p1, p2, and p3 projected on the virtual screen thereof.

$$\begin{cases} Su = k_1 \cdot x_0 \\ Sv = k_1 \cdot x_0 \\ S_w = k_1 \cdot d \end{cases} \quad (10)$$

$$\begin{cases} Au = k_1 \cdot \{x_1 - x_0 + \alpha \cdot x_1\} \\ Av = k_1 \cdot \{y_1 - y_0 + \alpha \cdot y_1\} \\ Aw = k_1 \cdot \alpha \cdot d \end{cases}$$

$$\begin{cases} Bu = k_1 \cdot \{x_3 - x_0 + \beta \cdot x_3\} \\ Bv = k_1 \cdot \{y_3 - y_0 + \beta \cdot y_3\} \\ Bw = k_1 \cdot \beta \cdot d \end{cases}$$

On this occasion, projective coefficients $\alpha$ and $\beta$ are expressed by the following formula.

$$\alpha = \dfrac{(x_0 - x_1 + x_2 - x_3) \cdot (y_3 - y_2) - (x_3 - x_2) \cdot (y_0 - y_1 + y_2 - y_3)}{(x_1 - x_2) \cdot (y_3 - y_2) - (x_3 - x_2) \cdot (y_1 - y_2)} \quad (11)$$

$$\beta = \dfrac{(x_1 - x_2) \cdot (y_0 - y_1 + y_2 - y_3) - (x_0 - x_1 + x_2 - x_3) \cdot (y_1 - y_2)}{(x_1 - x_2) \cdot (y_3 - y_2) - (x_3 - x_2) \cdot (y_1 - y_2)}$$

Next, projective transformation is described. An arbitrary point P(x, y) on the photographed print 3 can be represented as follows by using vectors S, A and B:

$$P = S + m \cdot A + n \cdot B \quad (12)$$

where m: a coefficient of vector A ($0 \leq m \leq 1$),
n: a coefficient of vector B ($0 \leq n \leq 1$).

When the formula (10) is substituted for this formula (12), coordinate values x and y are expressed by the following formula.

$$x = \dfrac{m \cdot (x_1 - x_0 + \alpha \cdot x_1) + n \cdot (x_3 - x_0 + \beta \cdot x_3) + x_0}{1 + m \cdot \alpha + n \cdot \beta} \quad (13)$$

$$y = \dfrac{m \cdot (y_1 - y_0 + \alpha \cdot y_1) + n \cdot (y_3 - y_0 + \beta \cdot y_3) + y_0}{1 + m \cdot \alpha + n \cdot \beta}$$

When the relationship shown in this formula (13) is applied to formula (7), coordinates (x', y', z') can be expressed as follows.

$$(x', y', z') = (m, n, 1) \begin{pmatrix} x_1 - x_0 + \alpha \cdot x_1 & y_1 - y_0 + \alpha \cdot y_1 & \alpha \\ x_3 - x_0 + \beta \cdot x_3 & x_3 - y_0 + \beta \cdot y_3 & \beta \\ x_0 & y_0 & 1 \end{pmatrix} \quad (14)$$

The coordinates (x', y', z') are determined by substituting values of m and n for this formula (14), and corresponding coordinates (x, y) on the photographed image are obtained with a formula similar to formula (8). Because the corresponding coordinates (x, y) are not necessarily integral values, pixel values are determined by using an image interpolation technique or the like.

The coefficients m and n can be determined by setting an image size ($0 \leq u < u\max$, $0 \leq v < v\max$) for outputting a corrected image p(u, v) and adjusting a size of a photographic print image so as to be fit into the image size. When this method is employed, the coefficients m and n can be calculated by the following formula.

$$m = \dfrac{u}{u\max} \quad (15)$$

$$n = \dfrac{v}{v\max}$$

However, an aspect ratio of the corrected image p to be created and an aspect ratio of the photographic print 3 are not necessarily match each other under the influence of distortion which occurs at the time of photographing or the like. Here, a relationship between the corrected image p and the coefficients m and n is expressed as follows from formulas (9) and (10).

$$k = \dfrac{|B|}{|A|} \dfrac{\sqrt{(x_3 - x_0 + \beta \cdot x_3)^2 + (y_3 - y_0 + \beta \cdot y_3)^2 + (\beta \cdot f)^2}}{\sqrt{(x_1 - x_0 + \alpha \cdot x_1)^2 + (y_1 - y_0 + \alpha \cdot y_1)^2 + (\alpha \cdot f)^2}} \quad (16)$$

When a focal length of a lens which is one of the camera parameters f is already known, the aspect ratio k can be obtained by formula (16). Accordingly, provided that an image size of the corrected image p is ($0 \leq u < u\max$, $0 \leq v < v\max$), it is possible to obtain the aspect ratio k which is the same as that of the photographic print 3 by determining the coefficients m and n by use of the following formula.

(1) where $v\max / u\max \leq k$ $$m = \dfrac{u}{v\max} \quad (17)$$

$$n = \dfrac{v}{v\max} (0 \leq u < u\max)$$

(2) where $v\max / u\max > k$ $$m = \dfrac{u}{u\max}$$

$$n = \dfrac{v}{u\max} (0 \leq v < v\max)$$

When the photographing device 1 has a fixed focus, a value of the focal length of the lens can be preset. When the photographing device 1 does not have a fixed focus, i.e., when there is a zoom lens or the like, a value of the focal length varies in accordance with a zoom magnification. For this reason, in such a case, a table showing a relationship between zoom magnifications and focal lengths is prepared in advance, whereby a focal length corresponding to a zoom magnification at the time of photographing is determined from the table.

Respective coordinates of the vertexes p0, p1, p2 and p3 shown in FIG. 7 are specified by edge detection processing. These coordinates are specified, so that projective coefficients α and β can be calculated by using formula (II), and the coefficients m and n can be determined from formulas (16) and (17). Therefore, formula (14) can be specified, and it is possible to generate a corrected image (a photographic print image after correction; hereinafter called a "corrected photographic print image" as well) p by using formula (14). An image size of the corrected image p corresponds to umax, vmax, and the aspect ratio k. The image size specifies a shape and a position thereof. Because projective transformation (affine transformation) is performed with the assumption of an image size, the corrected image p is obtained in such a manner that, in addition to a deforming operation and a scaling operation for correcting distortion, an rotating operation and a shifting operation are applied to the original image (photographic print image). It goes without saying that those various operations are to be performed as needed.

It is considered that it is extremely difficult to photograph only the desired photographic print 3 in an appropriate manner by the portable photographing device 1. It is considered that many users trying to digitize the desired photographic print 3 are careful not to leave portions which are not included. In that case, items other than the photographic print 3 (album, other photographic prints 3, and the like) will be included in most cases in photographing for digitizing the desired photographic print 3.

Under this assumption, in the present embodiment, only the desired photographic print 3 is digitized by automatically extracting the desired photographic print image in the photographed image. As described above, it is difficult to know how photographing is performed. Photographing is not necessarily performed in an appropriate manner. Therefore, the ideally photographed print (the corrected image p) is obtained automatically from the actual photographic print image. By performing such an operation onto the photographed image, conditions required for photographing in order to appropriately digitize the photographic print 3 are extremely relaxed. As a result, it is possible for a user of the photographing device 1 to more easily photograph the photographic print 3 for digitization.

A photographic print image (edge-detected area) is extracted by detecting edge (border lines) thereof. There is a possibility that a plurality of edge-detected areas specified by detecting edge exists in the photographed image. For example, cases are considered in which there are a plurality of photographic print images, and in which there are one or more photographic print images and images of one or more rectangular items different from a desired photographic print. For this reason, in the present embodiment, detected edges (edge-detected areas) are displayed (FIGS. 5B and 5C), and a user is prompted to select an edge-detected area in which a corrected image p is generated.

Because color fading has occurred on the photographic print 3 (object), color fading correction is applied onto only a corrected photographic print image generated by oblique photographing correction processing.

The corrected photographic print image is obtained by applying distortion correction and the like onto a desired photographic print image. Therefore, in color fading level detection processing, color fading level is detected on the desired photographic print image (edge-detected area). In the present embodiment, the detection is performed by preparing a histogram table for each component of RGB on respective pixels constituting the desired photographic print image, for example. The detection may be applied onto a corrected photographic print image. Histogram tables HT[f(x,y)] are made by incrementing with respect to each f(x,y). Here, f(x, y) represents each pixel value on the coordinates (x, y).

Histogram table (R component):
$HTr[fr(x,y)] \leftarrow HTr[fr(x,y)]+1$
Histogram table (G component):
$HTg[fg(x,y)] \leftarrow HTg[fg(x,y)]+1$
Histogram table (B component):
$HTb[fb(x,y)] \leftarrow HTb[fb(x,y)]+1$
(outAreaX≦x<maxX−outAreaX,
outAreaY≦y<maxY−outAreaY)

Some photographic prints 3 have a margin. Because there are no images in the margin, the margin is excluded from examination objects in the present embodiment. Suppose that numbers of pixels in the vertical and horizontal directions of an edge-detected area in which there is a photographic print image are respectively maxY and maxX, and the numbers of pixels in the vertical and horizontal directions for ignoring margin are respectively outAreaY and outAreaX. In anX-axis direction, a range of examination is outAreaX≦x<maxX−outAreaX, and in a Y-axis direction, a range of examination is outAreaY≦y<maxY−outAreaY. The respective numbers of pixels maxY, maxX, outAreaY, and outAreaX can be obtained from the edge-detected area. Those numbers of pixels are obtained under an assumption in which the edge-detected area is in a rectangular shape without distortion, and the four border lines thereof are parallel or perpendicular to the X-axis (i.e., the image is not rotated). An actual examination range varies depending on whether or not there exist distortion or rotation, and the level thereof.

Figure 8A:
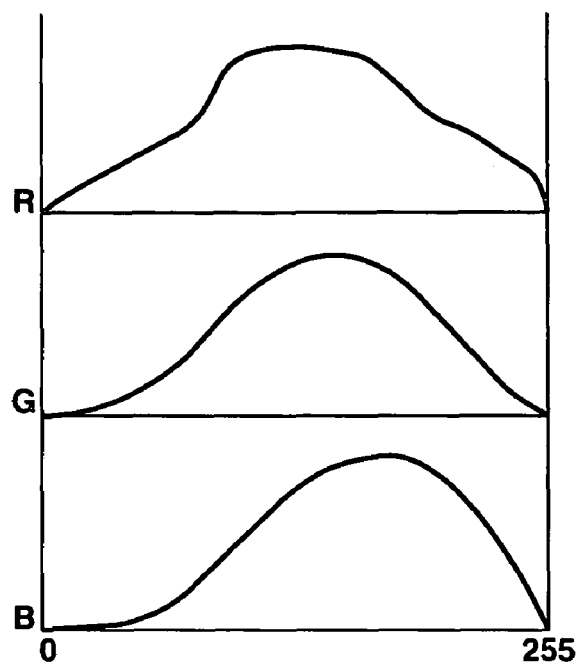
FIGS. 8A and 8B are diagrams for explanation of discoloration due to color fading.
Figure 8B:
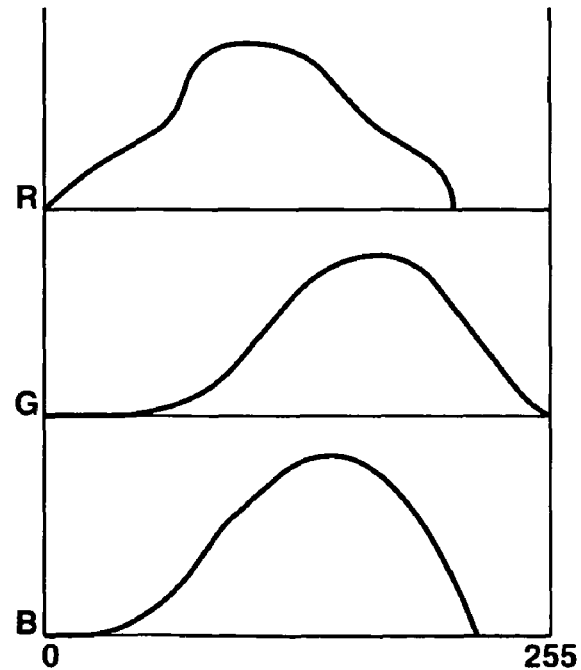

FIGS. 8A and 8B are diagrams for explanation of discoloration due to color fading. FIG. 8A shows an example of a histogram table of the respective components in an image with no color fading. FIG. 8B shows an example of a histogram table of the respective components in an image with color fading. In the respective histogram tables, the axes of abscissa show values of RGB, and the axes of ordinate show the numbers of pixels.

As shown in FIGS. 8A and 8B, the ranges of the values of RGB become narrower due to color fading. Thus, according to the present embodiment, the values of RGB at the maximum and the minimum sides are specified with reference to the respective histogram tables HTr[j], HTg[j], and HTb[j] when the numbers of pixels exceed a threshold. Here, suppose that the values at the maximum value sides specified for each component of RGB are called upper limits maxR, maxG, and maxB, and the values at the minimum value sides are called lower limits minR, minG, and minB, respectively. The upper limits and the lower limits of the respective components are determined as follows. That is, when the value j is expressed by 8 bits, i.e., when the value j is within a range of 0 to 255, it is determined one by one whether or not a corresponding number of pixels is over a threshold value while the value j is sequentially incremented from 0, for example. A threshold value may be a value arbitrarily determined. However, a threshold value may be a value obtained by multiplying a total number of pixels by a ratio arbitrarily determined. The upper limits and the lower limits are hereinafter referred to as generically color fading parameters.

Because the ranges in which the component values exist become narrower due to color fading, color fading correction is performed so as to extend the ranges. For that purpose, correction tables as shown below are prepared for each component of RGB.

Compensation table (R component): $STr[j] = \dfrac{255 \cdot (j - \min R)}{\max R - \min R}$ (18)

Compensation table (G component): $STg[j] = \dfrac{255 \cdot (j - \min G)}{\max G - \min G}$ Compensation table (B component): $STb[j] = \dfrac{255 \cdot (j - \min B)}{\max B - \min B}$ where $\min R \leq j \leq \max R$
$\min G \leq j \leq \max G$
$\min B \leq j \leq \max B$ In the respective correction tables STr[j], STg[j], and STb[j], corrected component values are stored in records designated by a component value j. Consequently, color fading correction is performed such that the component value j is changed to the component values stored in the records designated by the value j. When each RGB pixel value on the coordinates (x, y) is respectively represented by fr(x, y), fg(x, y), and fb(x, y), and is changed as follows by color fading correction. Here, fr(x, y), fg(x, y), and fb(x, y) represent respectively RGB components of a corrected pixel. By the change, the histogram table of the respective components shown in FIG. 8B is changed to that shown in FIG. 8A.

Compensated pixel value (R component):

$fr(x,y) = STr[fr(x,y)]$

Compensated pixel value (G component):

$fg(x,y) = STg[fg(x,y)]$

Compensated pixel value (B component):

$fb(x,y) = STb[fb(x,y)]$ (19)

Color fading generally occurs on a photographic print, however, color fading not necessarily occurs on the photographic print 3 to be actually photographed. Therefore, in the present embodiment, it is determined whether or not color fading has occurred in accordance with the upper limits and the lower limits (color fading parameters) detected for each component. By the following formula, a color fading ratio is calculated as the information indicating a level of color fading, and the determination is performed according to whether or not the calculated color fading ratio is less than or equal to a predetermined threshold value. Accordingly, when color fading ratio is less than or equal to the threshold value, it is determined that color fading has occurred.

Color degradation ratio:

$((\max R - \min R) + (\max G - \min G) + (\max B - \min B))/(256 \times 3)$ (20)

Note that the determination of whether or not color fading has occurred may be performed for each component. The determination, as shown below for example, may be performed according to whether or not a difference between an upper limit and a lower limit is less than a threshold value THRange. In this case, it may be determined, in accordance with the determination result of each component, whether or not to perform color fading correction.

$\begin{cases} (\max R - \min R) < THRange \\ (\max G - \min G) < THRange \\ (\max B - \min B) < THRange \end{cases}$ (21)

Even if color fading has occurred on the photographed photographic print 3, by performing color fading correction onto the corrected photographic print image as needed, the color on the corrected photographic print image is automatically corrected to be the original color (color before color fading occurs) or a color close thereto. The corrected photographic print image subjected to such color fading correction as needed is regarded as an object to be saved as a digitization result of the photographic print 3. Therefore, it is possible for a user to digitize the photographic print 3 in an optimum form for saving only the photographic print 3 as is by photographing the photographic print 3 with the photographing device 1. Because it is only necessary to photograph the photographic print 3 by the photographing device 1, i.e., because there is no need to additionally perform image processing onto a photographed and stored image, it is possible to extremely easily perform optimum digitization of the photographic print 3.

The CPU 204 causes the image processing device 203 to perform the various image processing described above onto the photographed image data stored in the memory 201 by photographing when the color fading correction mode is set. Hereinafter, operations of the photographing device 1 under the control of the CPU 204 will be described in detail with reference to various flowcharts shown in FIGS. 9 to 13.

Figure 9:
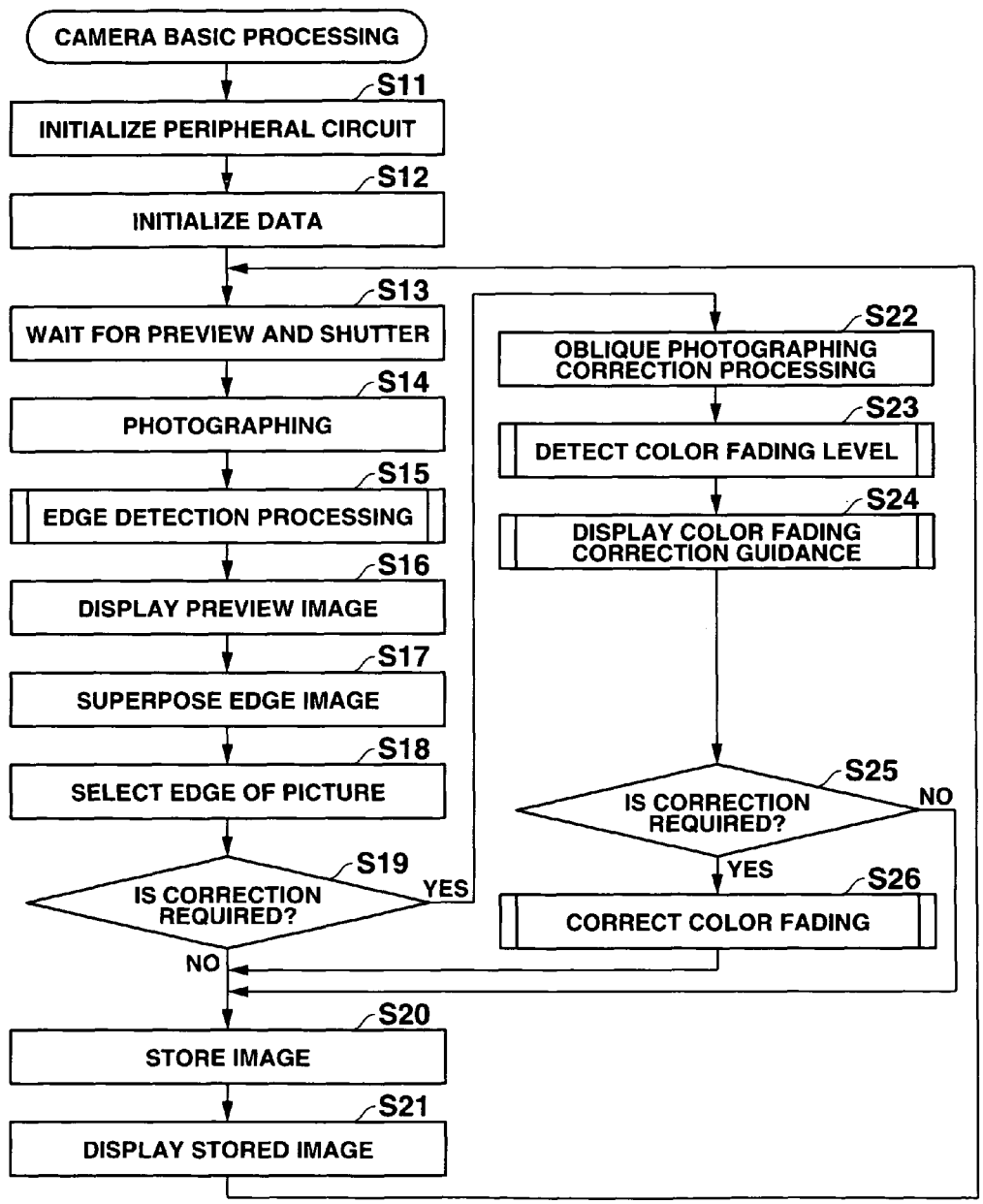
FIG. 9 is a flowchart of camera basic processing.

FIG. 9 is a flowchart of camera basic processing. FIG. 9 shows the flow of the basic processing executed by the CPU 204 until the mode is cancelled when the color fading correction mode is set. First, the basic processing will be described in detail with reference to FIG. 9. The basic processing is realized such that the CPU 204 loads and executes a program stored in the program code storage device 205.

First, in step S11, a peripheral circuit is initialized, and in the following step S12, initialization of data and setting for displaying a preview image are performed. At this time, a program for image processing is loaded from the code storage device 205 to be transferred to the image processing device 203. As a consequence, the image processing device 203 is set to enable the various image processing to be performed.

In step S13 following step S12, an operation of the shutter key is waited for, while updating the preview image. When notice of an operation of the shutter key is given from the operating unit 302, the flow proceeds to step S14. When notice of an operation of the mode change-over switch or the sub-mode change-over switch is given from the operating unit 302, a mode specified by an operated switch is set. After starting of the processing for the mode, the flow ends.

In step S14, the optical lens device 101 and the image sensor 102 are controlled to perform photographing under conditions set at the time. The conditions include camera parameters f. In the following step S15, the image processing device 203 is instructed to apply edge detection processing onto the photographed image data stored in the memory 201 by photographing.

Figure 5A:
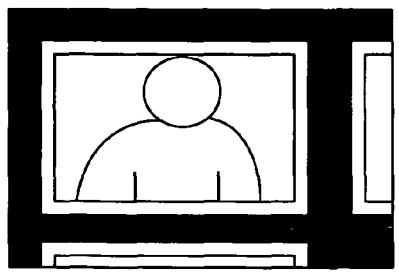
FIGS. 5A, 5B, 5C, 5D, 5E and 5F are diagrams for explanation of various images displayed on a liquid crystal display unit when an object is photographed.

In step S16 following step S15, the video output device 202 is instructed to display the preview image based on the photographed image data on the liquid crystal display unit 301 as shown in FIG. 5A. In the following step S17, an edge detected by causing the image processing device 203 to perform edge detection processing is displayed so as to superimpose on the preview image. The edge is displayed in such a manner that the CPU 204 changes image data of a portion detected as the edge in the photographed image data.

Figure 5B:
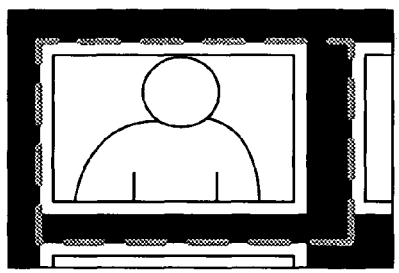
Figure 5C:
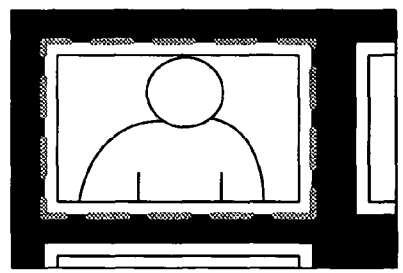

FIG. 5B shows a case of failure in the edge detection, i.e., a display example in a case where the detection has failed. FIG. 5C shows a case of success in edge detection, i.e., a display example in a case where the detection has succeeded. Both the cases of failure and success, shown respectively in FIGS. 5B and 5C, are cases which occur when photographic prints 3 affixed to the album 2 so as to be adjacent to one another are photographed. In the case of failure shown in FIG.

5B, the detection has failed in such a manner that the edge of an adjacent photographic print is detected as the edge line of the desired photographic print 3 which is shown up entirely. In the case of success, shown in FIG. 5C, the detection has succeeded in such a manner that the edges of other photographic prints 3 are distinguished precisely.

As described above, the detection of edge is performed on the edge image (FIG. 3D) whose edges contacting the outermost edge have been erased. As described above, in most cases, the other photographic prints 3 adjacent to the desired photographic print 3 will be photographed so as to show up only some portions thereof even if those are shown up. Therefore, only when the borders between the other photographic prints 3 and the background (mounting) of the album cannot be detected, failure as shown in FIG. 5B occurs. Because the edge image is generated so as to emphasize the edges including the borders, the failure as shown in FIG. 5B hardly occurs.

In step S18 which is performed after the edge is displayed, it is waited for a user to select the edge (edge-detected area) by operating the operating unit 302. The selection is performed by an operation of, for example, the arrow keys. If the edge is selected, the flow proceeds to the following step S19 by giving notice of an operation caused by the user from the operating unit 302. Although the detailed description is omitted, because there is a possibility that the extraction of the edge-detected area fails, it is possible to instruct to abandon the photographed image at this step. When the user instructs to abandon, the routine returns to step S13.

In step S19, the user is inquired about whether or not to correct color fading which has been occurred, and it is determined whether or not the user instructs to correct color fading in reference to the inquiry. When the user instructs to perform correction by operating the operating unit 302, the determination result is YES, and the flow proceeds to step S22. Otherwise, the determination result is NO, and the flow proceeds to step S20.

In step S20, image data finally obtained (photographed image data, a corrected image p which is not subjected to color fading correction, or a corrected image p subjected to color fading correction) are stored in the format of file into the external storage device 304. In step S21 which is performed after step S20, the saved image is displayed on the liquid crystal display unit 301 for a given length of time. Thereafter, the flow returns to step S13, and is prepared for the following photographing.

On the other hand, in step S22, the image processing device 203 is instructed to perform oblique photographing correction processing onto the edge-detected area (photographic print image) selected by the user. In the correction processing, projective coefficients $\alpha$ and $\beta$ are calculated by using formula (11), and the coefficients m and n are calculated from formulas (16) and (17). According to the results, formula (14) is calculated, and a corrected image p is generated by using formula (14). The flow proceeds to step S23 after the corrected image p (corrected photographic print image) is generated. The generated corrected image p is stored in a predetermined area of the memory 201.

In step S23, the image processing device 203 is instructed to execute color fading level detection processing for detecting a color fading level on the edge-detected area. In the following step S24, the image processing device 203 is caused to execute color fading correction processing in accordance with a detection result, and then, the flow proceeds to step S20.

As described above, when a color fading ratio calculated by formula (20) is less than or equal to a threshold value, it is regarded that color fading has occurred. For this reason, in color fading correction processing, an operation for color fading correction onto the corrected image p is not performed when it is regarded that color fading has not occurred. As a consequence, when the flow proceeds to step S20, the corrected image p which is not subjected to color fading correction, or the corrected image p subjected to color fading correction is saved.

In step S23, the image processing device 203 is instructed to execute color fading level detection processing for detecting a color fading level on the edge-detected area. In the following step S24, color fading correction guidance display processing is executed for giving notice of a detection result to a user. In the guidance display processing, as will be described later, the user is prompted to finally select whether or not to perform color fading correction. Consequently, in step S25, it is determined whether or not the user instructs to execute color fading correction. When the user instructs to execute it, the determination result is YES. After the image processing device 203 is caused to execute color fading correction processing in step S26, the flow proceeds to step S20. Otherwise, the determination result is NO, and the flow directly proceeds to step S20.

Figure 5D:
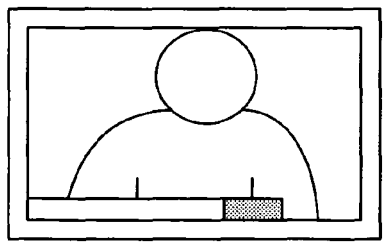
Figure 5E:
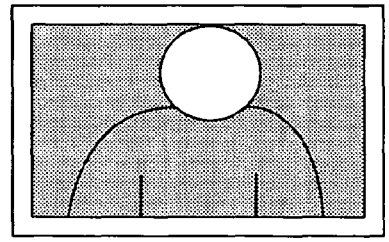
Figure 5F:
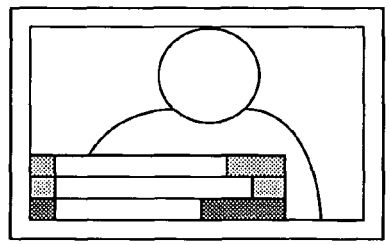

In color fading correction guidance display processing, as a result of detecting a color fading level, a color fading ratio calculated by formula (20) is displayed as shown in, for example, FIG. 5D. As a consequence, the user is prompted to determine the necessity to execute color fading correction. When the user instructs to execute color fading correction, a corrected image p subjected to color fading correction is displayed in step S21 as shown in, for example, FIG. 5E. As a result of detecting a color fading level, the upper limits and the lower limits which have been detected for each component of RGB (color fading parameters; formula (21)) may be displayed as shown in, for example, FIG. 5F.

Hereinafter, the image processing to be executed by the image processing device 203 in the camera basic processing will be described in detail.

Figure 10:
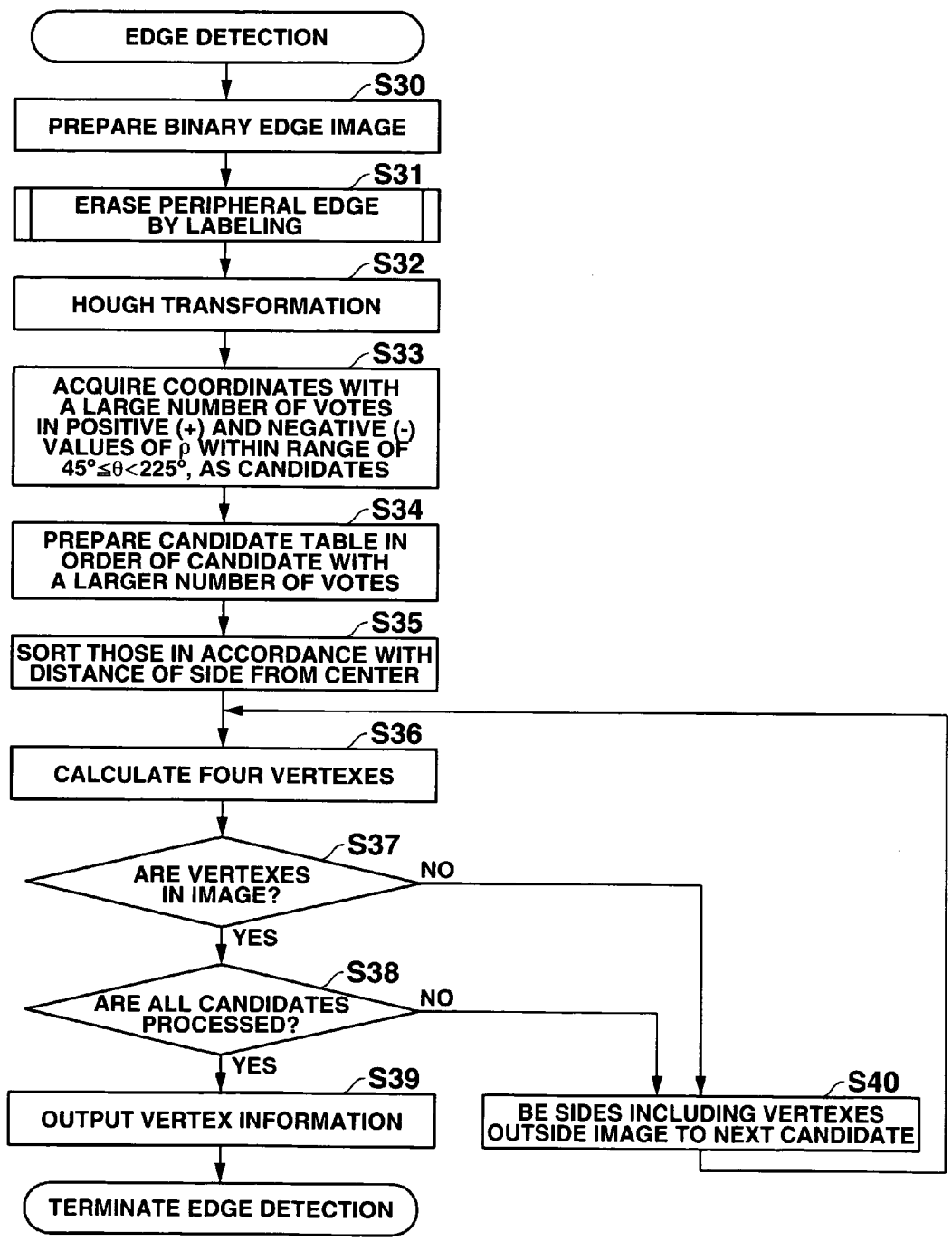
FIG. 10 is a flowchart of edge detection processing.

FIG. 10 is a flowchart of edge detection processing to be executed by the image processing device 203 in step S15. Next, the edge detection processing will be described in detail with reference to FIG. 10. The various image processings by the image processing device 203 are realized such that the image processing device 203 executes programs for the image processing which are loaded from the code storage device 205 to be transferred by the CPU 204.

First, in step S30, a binary edge image h is created from the photographed image by using formula (1) and a threshold value. In the following step S31, peripheral edge erasure processing by labeling is executed for erasing peripheral edge contacting the outermost edge from the edge image. By executing the erasure processing, an edge image as shown in FIG. 3B is updated as shown in FIG. 3D.

In step S32, Hough transform is performed in which numbers of points constituting a straight line (edge line) on an X-Y plane as shown in FIG. 6A are "voted" on a $\rho$-$\theta$ plane as shown in FIG. 6B by formula (4), and are transformed into the number of votes on the $\rho$-$\theta$ plane. In the following step S33, a plurality of coordinates with a large number of votes with respect to respectively positive and negative values of the distance $\rho$ are acquired (specified) as information indicating candidates of the edge line within the range of $45° \leq \theta 0 < 225°$, more precisely, the ranges respectively shown in formula (5) and formula (6). By specifying in this way, the edge lines (border lines) positioned on the top, bottom, left, and right of the origin are respectively specified as candidates. Thereafter, the flow proceeds to step S34.

In step S34, a candidate table is prepared in which the specified coordinates are arranged in the descending order from the largest number of votes. In the following step S35, the order of the coordinates is sorted from a maximum magnitude (absolute value) of the distance ρ from the center. In step S36, coordinates (candidates) respectively positioned on the top, bottom, left, and right are selected one by one with reference to the candidate table, and coordinates of an intersecting point at which two candidates intersect each other are respectively calculated as coordinates of the vertexes from among the four candidates. When distances between the ends of the two candidates and the intersecting point are not within a predetermined range, it is determined that those candidates do not intersect with each other, and those are excluded from the objects of combinations constituting the vertexes. After the coordinates of the total four vertexes are calculated, the flow proceeds to step S37, and it is determined whether or not all the calculated coordinates of the vertexes are within the photographed image. When at least one vertex is not within the photographed image, the determination result is NO, and the flow proceeds to step S40. After the coordinates used for calculating the coordinate of the vertex which does not exist in the photographed image are respectively changed to other candidates positioned in the same direction as seen from the origin, the flow returns to step S36. As a consequence, the candidate not to be considered as the candidate constituting the edge-detected area is erased. Otherwise, the determination result is YES, and the routine proceeds to step S38.

Figure 3G:
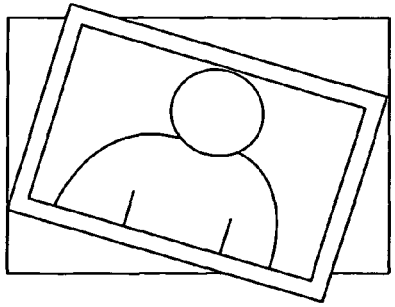

It is conditional on that all the four vertexes exist in the photographed image. Therefore, in the present embodiment, as shown in FIG. 3G, it is determined as a prohibited matter that photographing the photographic print 3 not to entirely come out, and the user is required not to perform such photographing. The reason why the prohibited matter is determined is that to require the user photographing the desired photographic print 3 appropriately.

In step S38, it is determined whether or not the calculation of the coordinates of the four vertexes on all the coordinates (candidates) stored in the candidate table is completed. When there are no coordinates to be considered in the candidate table, the determination result is YES, and the flow proceeds to step S39. After the coordinates of the four vertexes which all exist within the photographed image are saved and output to the CPU 204, the series of processing is terminated. Otherwise, the determination result is NO, and the routine proceeds to step S40. After one of the four candidates is changed to another candidate with reference to the candidate table, the flow returns to step S36.

As described above, for the purpose of further appropriate digitization, it is considered that the user will photograph, in many cases, the photographic print 3 desired to digitize so as to show up significantly, while trying not to generate portions which are not shown up. Therefore, outermost edge priority is employed. This is why the candidate table is prepared as in step S34, and the coordinates are sorted as in step S35.

There may be a plurality of combinations of four vertexes which all exist in the photographed image. For example, when the photographic print 3 having a white margin is photographed, both the outer side and the inner side of the white margin are expressed as edges in a binary edge image. For this reason, the present embodiment is configured such that, when there are a plurality of combinations of four vertexes in step S39, a combination of four vertexes furthest away from the origin is regarded as an edge-detected area (FIGS. 3F and 5C), and notice of those coordinates is given to the CPU 204. The CPU 204 copies the photographed image stored, for example, in the memory 201 to another area, overwrites an image for displaying the edges specified from the notified coordinates of four vertexes onto the copied photographed image, and displays the photographed image after the overwriting on the video output device 202. As a result, the CPU 204 displays an image as shown in FIG. 5B or FIG. 5C on the liquid crystal display unit 301.

In step S39, the numbers of pixels maxY and maxX in the vertical or horizontal direction in the edge-detected area specified by the four vertexes are, for example, counted or calculated to be saved for color fading correction. Further, it is determined whether or not there is another combination which all four vertexes are positioned in the vicinity of the four vertexes within the area specified by the four vertexes. When such a combination can be confirmed, it is determined that there is a white margin, and the respective numbers of pixels in a longitudinal direction and a transverse direction outAreaY and outAreaX are counted or calculated to be saved. Accordingly, when there is a white margin, color fading correction can be performed on only an inner area thereof.

Figure 11:
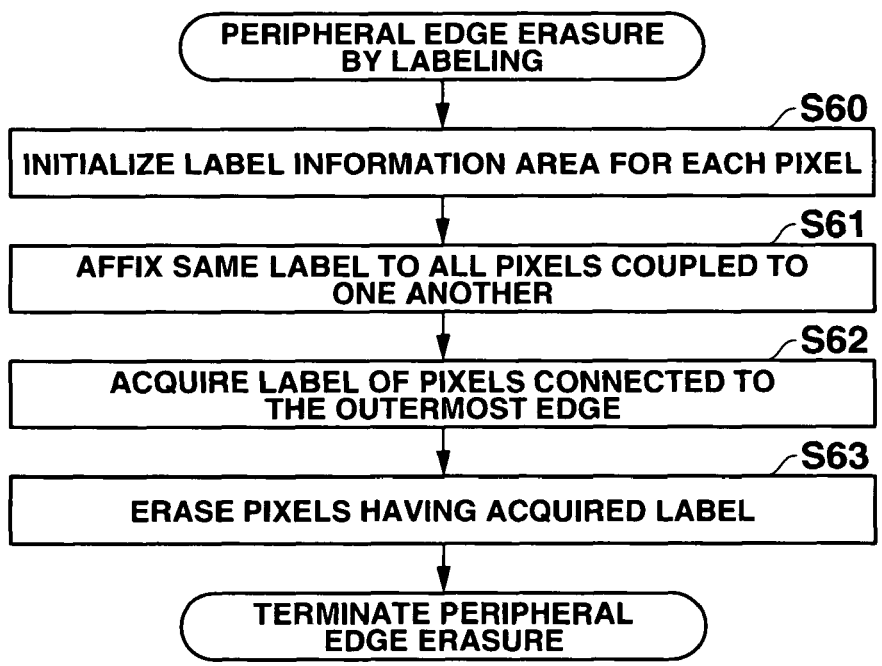
FIG. 11 is a flowchart of peripheral edge erasing processing by labeling.

FIG. 11 is a flowchart of peripheral edge erasure processing by labeling which is executed as step S31. Next, the erasure processing will be described in detail with reference to the flowchart shown in FIG. 11.

First, in step S60, a label information area for storing labels to be assigned to respective pixels of the edge image (FIG. 3B), for example, is set in the memory 201, and the area is initialized. In the following step S61, the connection state among the pixels constituting the edge is examined on all the pixels of the edge image, and the same label is assigned to all the connected pixels, i.e., all the pixels constituting the same edge line. When the assignment is completed, i.e., all labels to be stored in the label information area are stored, the flow proceeds to step S62.

In step S62, the label assigned to the pixels constituting the edge contacting the outermost edge is obtained (specified) with reference to the label information area. In step S63, all the pixels to which the obtained label is assigned are erased. The erasure is performed by erasing the label from the label information area, and by setting values of the pixels to which the erased label is assigned to zero. In this way, after the edge image is updated as in FIG. 3D by erasing all the pixels to be invalid as the edge, the flow is terminated.

Figure 12:
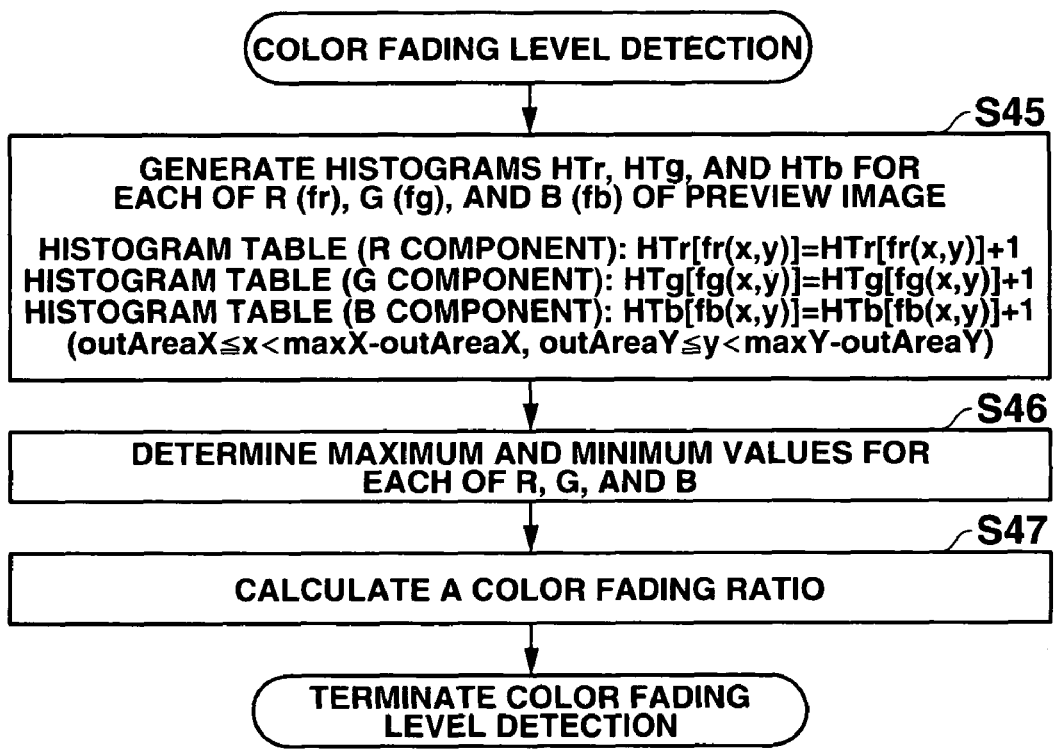
FIG. 12 is a flowchart of color fading level detection processing.

FIG. 12 is a flowchart of color fading level detection processing to be executed by the image processing device 203 in step S23 in the camera basic processing shown in FIG. 9. Next, the detection processing will be described in detail with reference to FIG. 12.

First, in step S45, histogram tables HTr, HTg, and HTb are generated for each component of RGB on an edge-detected area (a desired photographic print image) which is specified by executing the edge detection processing, and is selected by the user (formula (15)). The generation is performed by using the numbers of pixels maxY, maxX, outAreaY, and outAreaX which are specified on the basis of results of executing the edge detection processing. The flow proceeds to step S46 after the generation.

In step S46, upper limits (maximum values) and lower limits (minimum values) of the values are determined (specified) for each component of RGB respectively with reference to the generated histogram tables HTr, HTg, and HTb. In the following step S47, a color fading ratio is calculated from formula (20) by use of the upper limits (maximum values) and the lower limits (minimum values) determined for each component of RGB, and the calculated color fading ratio is saved together with the upper limits (maximum values) and the lower limits (minimum values) (color fading parameters) determined for each component of RGB. The flow is terminated thereafter.

Figure 13:
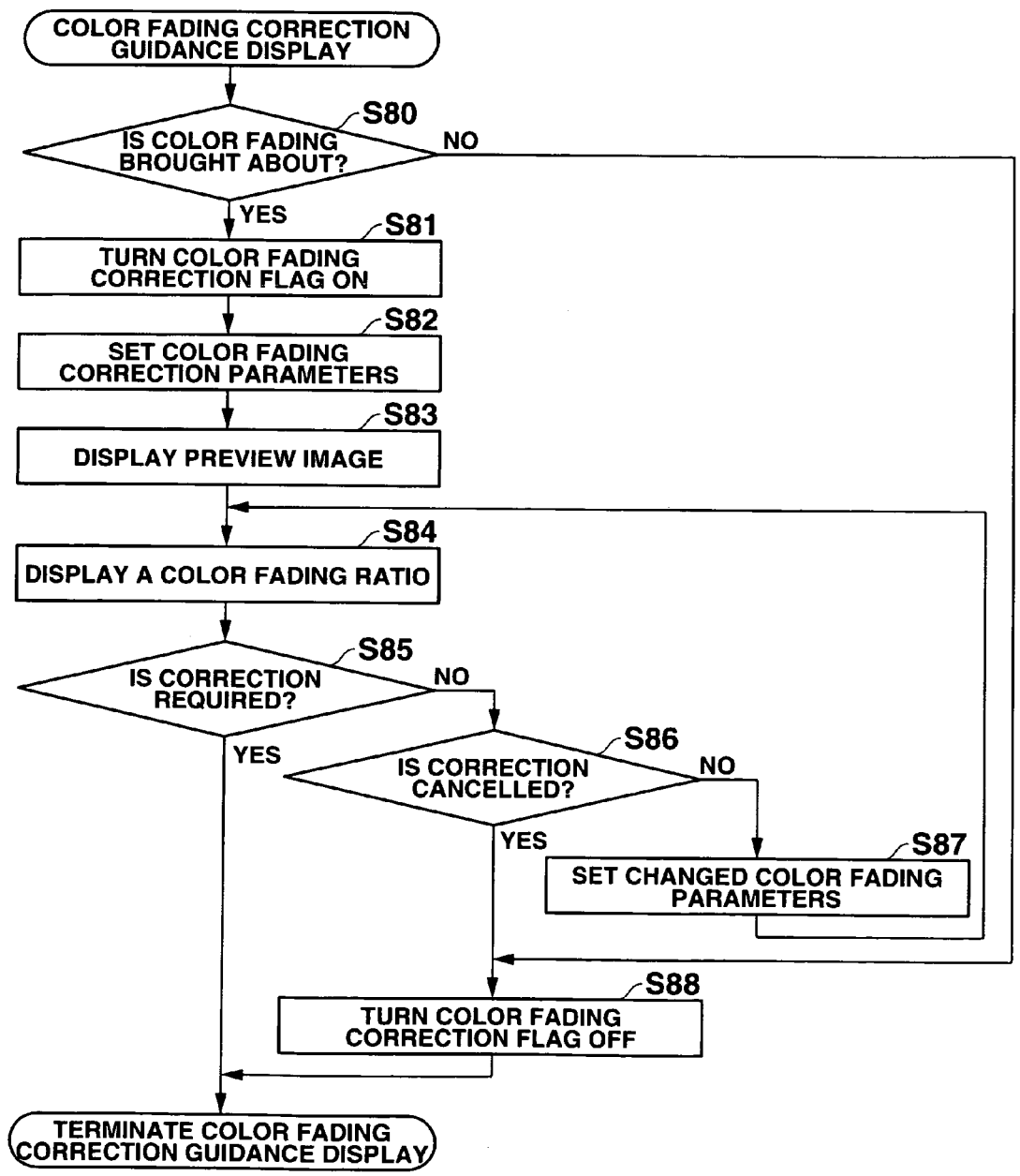
FIG. 13 is a flowchart of color fading correction guidance display processing.

FIG. 13 is a flowchart of color fading correction guidance display processing which is executed as step S73 in the camera basic processing shown in FIG. 9. The display processing is sub-routine processing executed by the CPU 204 after the image processing device 203 gives notice of a color fading ratio or the like.

In the present embodiment, not only the user is prompted to select to execute color fading correction or not, but also it is possible for the user to arbitrarily designate a level to which color fading correction is executed. When it is required to change the level by operating the operating unit 302, the designation is performed such that, as shown in FIG. 7F, the upper limits and the lower limits are displayed for each component of RGB, and the upper limits and the lower limits are changed.

First, in step S80, it is determined whether or not color fading has occurred by comparing the notified color fading ratio and the threshold value. As described above, when color fading ratio is less than or equal to the threshold value, it is determined that color fading has occurred, and thus, the determination result is YES, and the flow proceeds to step S81. Otherwise, the determination result is NO, and after a color fading correction flag is turned OFF in step S88, the flow is terminated. Color fading correction flag is a variable for determining whether or not color fading correction is required, and OFF corresponds to substituting a value representing that the correction is not required. When it is determined that the correction is not required, the determination result is NO in step S25 shown in FIG. 9.

In step S81, color fading correction flag is turned ON. In the following step S82, the upper limits and the lower limits whose notices have been given from the image processing device 203 are set as color fading parameters for each component of RGB. Thereafter, the flow proceeds to step S83, and only the corrected image p (corrected photographic print image) is displayed as a preview image. In the following step S84, an image indicating color fading ratio is displayed in a superimposed manner. Consequently, an image as shown in FIG. 5D is displayed on the liquid crystal display unit 301. As described above, the corrected image p is stored in the area set in the memory 201. Accordingly, the display is performed, for example, by copying the corrected image p onto another area and instructing the video output device 202 to display it. Bars indicating color fading ratio are displayed, for example, by overwriting the images onto the copied corrected image p.

In step S85 following step S84, it is determined whether or not the user instructs to execute color fading correction. When the user instructs to execute color fading correction by operating the operating unit 302, the determination result is YES, and here, the flow is terminated. In this case, because color fading correction flag is ON, the determination result is YES, in step S25 shown in FIG. 9. Otherwise, the determination result is NO, and the flow proceeds to step S86.

In step S86, it is determined whether or not the user instructs to cancel color fading correction. When the user instructs to cancel color fading correction by operating the operating unit 302, the determination result is YES. After color fading correction flag is turned OFF in step S88, the flow is terminated. In this case, because color fading correction flag is OFF, the determination result is NO in step S25 shown in FIG. 9. Otherwise, the determination result is NO, and the flow proceeds to step S87.

In step S87, processing for changing color fading parameters, i.e., the upper limits and the lower limits for each component of RGB, is executed in accordance with an operation of the operating unit 302. The changes are performed by operating the image displayed on the liquid crystal display unit 302. When the user instructs to apply the changed contents, the upper limits and the lower limits currently displayed for each component of RGB are set as changed color fading parameters, and then the flow returns to step S84 where color fading ratio calculated from the changed color fading parameters are newly displayed. Accordingly, it is possible to confirm the changed color fading parameters by color fading ratio.

Figure 14:
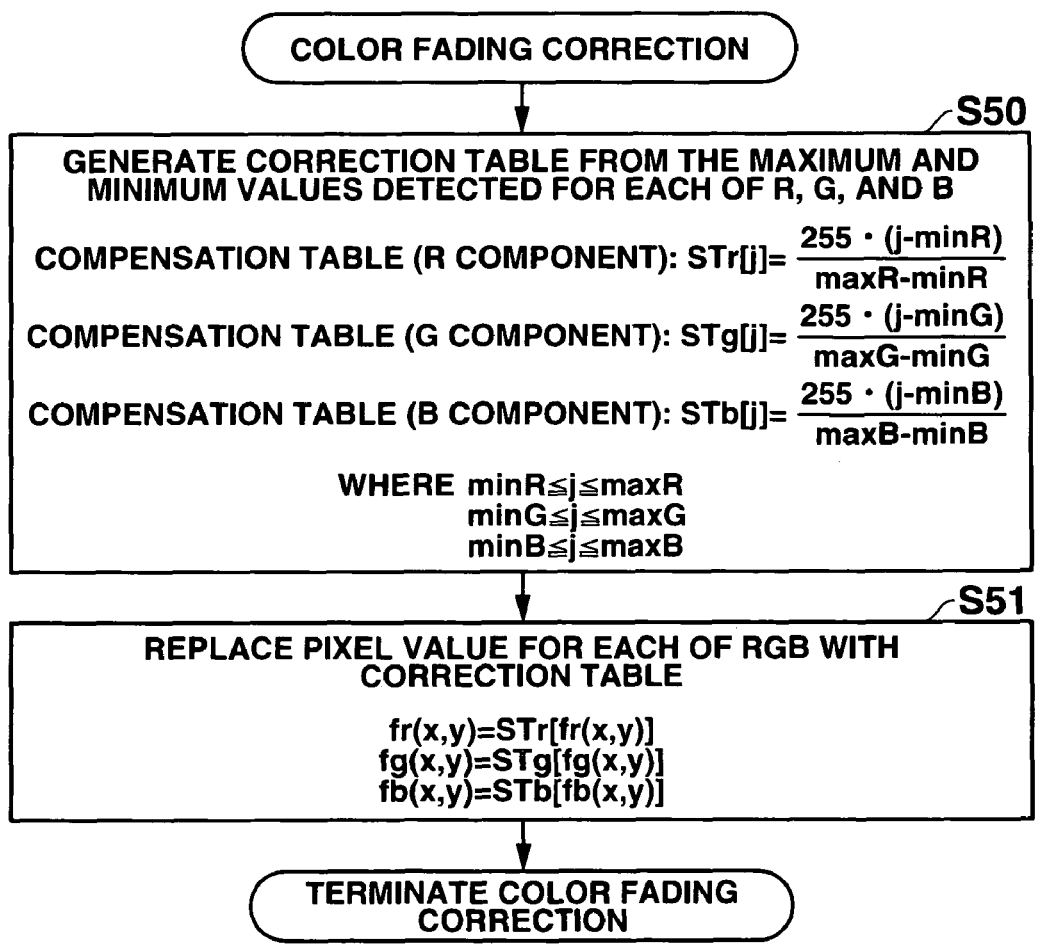
FIG. 14 is a flowchart of color fading correction processing.

FIG. 14 is a flowchart of color fading correction processing to be executed by the image processing device 203 in step S24 in the camera basic processing shown in FIG. 9. The correction processing will be described in detail with reference to FIG. 14.

As described above, in color fading correction processing, an operation for color fading correction onto the corrected image p is not performed when the color fading ratio is greater than a threshold value, namely, when it is considered that no color fading has occurred. In FIG. 14, processing relating to the determination to perform or not color fading correction is omitted, and only processing executed after the determination to perform color fading correction is selectively shown.

First, in step S50, correction tables STr, STg, and STb are prepared for each component of RGB from formula (18) by use of color fading parameters. In the following step S51, as shown in formula (19), the component values of RGB components of the respective pixels constituting the corrected image p are replaced with the values stored in records of the correction tables STr, STg, and STb specified by the values. After color fading correction is performed on all the pixels in this way, the flow is terminated.

Note that, in the present embodiment, the user is prompted to select an object for color fading correction in an extracted edge-detected area, and to select to execute or not color fading correction. However, at least one of those may be omitted. Namely, at least one of the selection of an edge-detected area to be an object for color fading correction and the selection to execute or not color fading correction may be automatically performed. Although it is possible for the user to arbitrarily change color fading parameters, it may be made impossible execute the changes.

The edge-detected area is extracted based on an assumption that a shape of the edge of the photographic print 3 is linear. Many photographs (for example, gravures) printed on newspapers and books (including magazines and the like) have such a linear edge. Spaces and pages of the newspapers and books usually have the same feature. Given this situation, the photographic prints 3 may be such printed photographs, paper spaces, or pages. When such objects are photographed as the photographic prints 3, those can be digitized to be saved on a database. Even if color fading has occurred as time passes, those can be saved in more appropriate state by performing the correction thereto. Accordingly, the present invention is extremely effective for saving various printed matters after digitized.

The corrected image p subjected to color fading correction is to be saved. However, it is difficult to estimate how a result of color fading correction is changed in accordance with contents of color fading parameters. If so, even if color fading parameters can be arbitrarily changed, the optimum color fading correction for the user may not be performed onto the saved corrected image p. Therefore, in order to save the corrected image p onto which color fading correction regarded as optimum has been applied, photographing of the photographic print 3 may be repeatedly performed. Repetitive photographing of the same photographic prints 3 which is very troublesome should be avoided. The repetitive photographing can be avoided, for example, by changing color fading correction guidance display processing shown in FIG. 13 to shown in FIG. 15.

Figure 15:
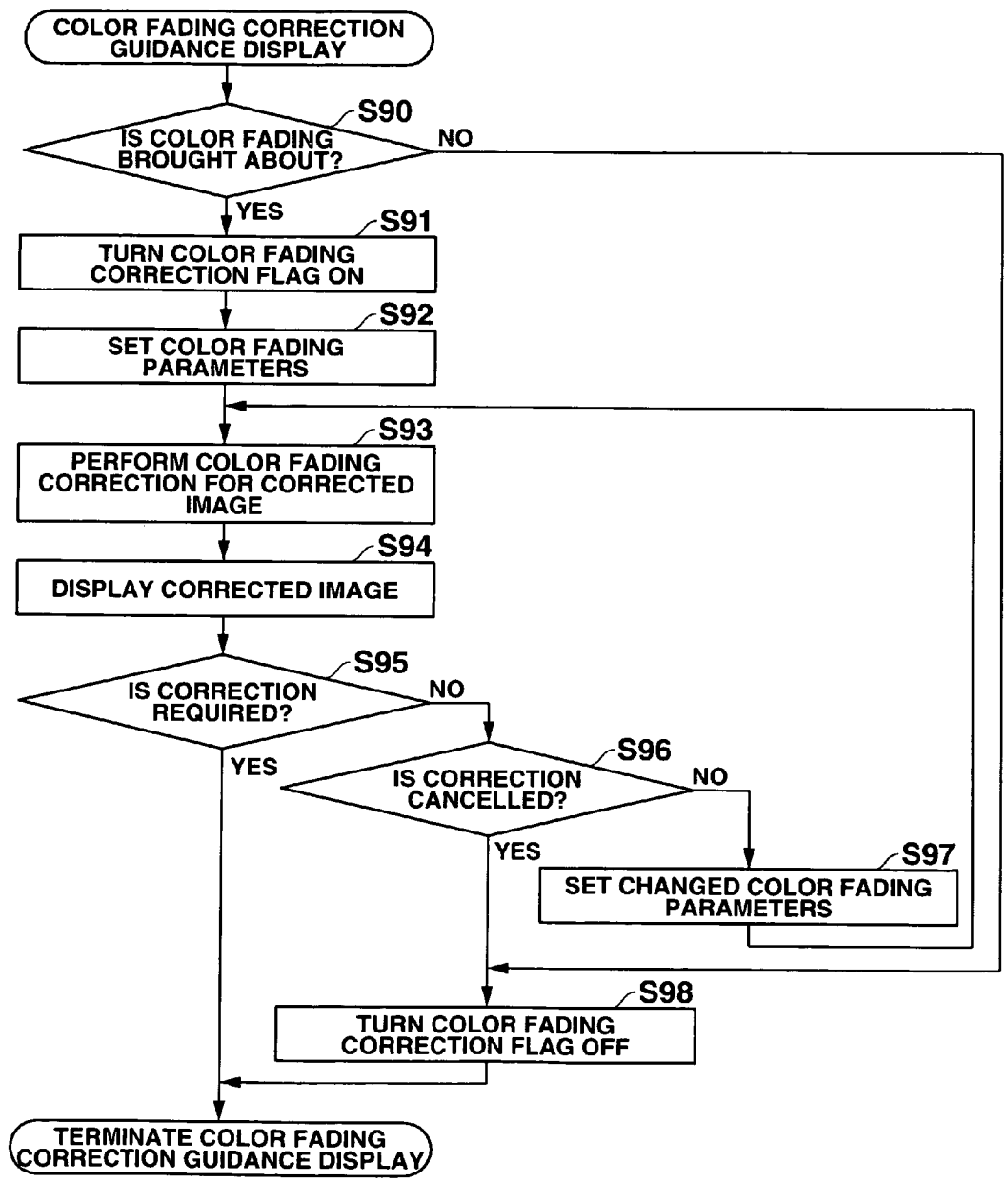
FIG. 15 is a flowchart of modification of color fading correction guidance display processing.

In FIG. 15, processings in steps S90 to S92, and in steps S95 to S97 are the same as processings in steps S80 to S82, and in steps S85 to S87. For this reason, only portions different from those of FIG. 13 will be described.

In FIG. 15, color fading correction according to the current color fading parameters is performed onto the corrected image p in step S93. The corrected image p after color fading correction is displayed as a preview image on the liquid crystal display unit 301 in the following step S94. After the user changes color fading parameters in step S97, the flow returns to step S93, whereby the corrected image p subjected to color fading correction according to the changed color fading parameters is newly displayed. As a consequence, it is possible for the user to confirm whether or not color fading correction can be appropriately performed with the corrected image p displayed as a preview image. This makes it possible for the user to save the corrected image p subjected to the optimum color fading correction without repeatedly photographing of the photographic print 3.

Second Embodiment

In the first embodiment, weighting is performed such that all the edges contacting the outermost edge are erased. However, when all these edges are erased, the edge of the desired photographic print image which must not be erased may be erased when, as shown in FIG. 3E, the edge of the desired photographic print image contacts the edge of another photographic print image extending from the outermost edge. If the edge of the desired photographic print is erased, it is impossible to precisely detect the edge-detected area where the print image exists. If a plurality of photographic prints 3 are affixed to the album 2 as shown in FIG. 3E, this is undesirable. The second embodiment aims to avoid a possible defect generated since the edge, which must not be erased, contacts the edge to be erased. According to the second embodiment, it is possible to detect an edge-detected area precisely.

The configuration of the photographing device including the image processing apparatus according to the second embodiment is basically the same as that in the first embodiment. Operations thereof are mostly the same, or basically the same. For this reason, only portions which are different from those in the first embodiment will be described by using the reference numerals denoted in the first embodiment.

In the second embodiment, in order to avoid the above-described defect, edge contacting the outermost edge is erased according to the values of the x-y coordinates of pixels constituting the edge, like Bayer pattern for example. Namely, the coordinates to be objects of erasing are determined in advance, and the pixels having the predetermined coordinates and constituting the edge contacting the outermost edge are erased. In this way, weighting is performed by partially erasing the edge contacting the outermost edge. The partially erasing may be performed by using another method.

By the partial erasure of the edge line contacting the outermost edge, the number of votes of the partially erased edge line is reduced. As a result, the level of importance as a candidate for the edge line of the desired photographic print image is lowered. However, the edge line of the desired photographic print image is specified in consideration of the coordinates of the four vertexes, i.e., the other three edge lines. Even if one or more edge lines of the desired photographic print image are partially erased, the coordinates of the four vertexes determined by a combination with the other edge lines become, as coordinates indicating an image area of the desired photographic print image, more appropriate than the other. Therefore, even if all the edge lines of the desired photographic print image are partially erased, the probability that all the edge lines are specified as the edge lines of the desired photographic print image is maintained to be high. As a result, even if the partial erasure is performed, it is possible to more certainly detect the edge lines of the desired photographic print image in comparison with the first embodiment. The desired photographic print image can be certainly and precisely detected as shown in FIG. 3F even from the edge image as shown in FIG. 3E.

In the second embodiment, the peripheral edge erasure processing by labeling shown in FIG. 11 is different from the first embodiment. For this reason, the erasing processing in the second embodiment will be described in detail with reference to a flowchart shown in FIG. 16.

Figure 16:
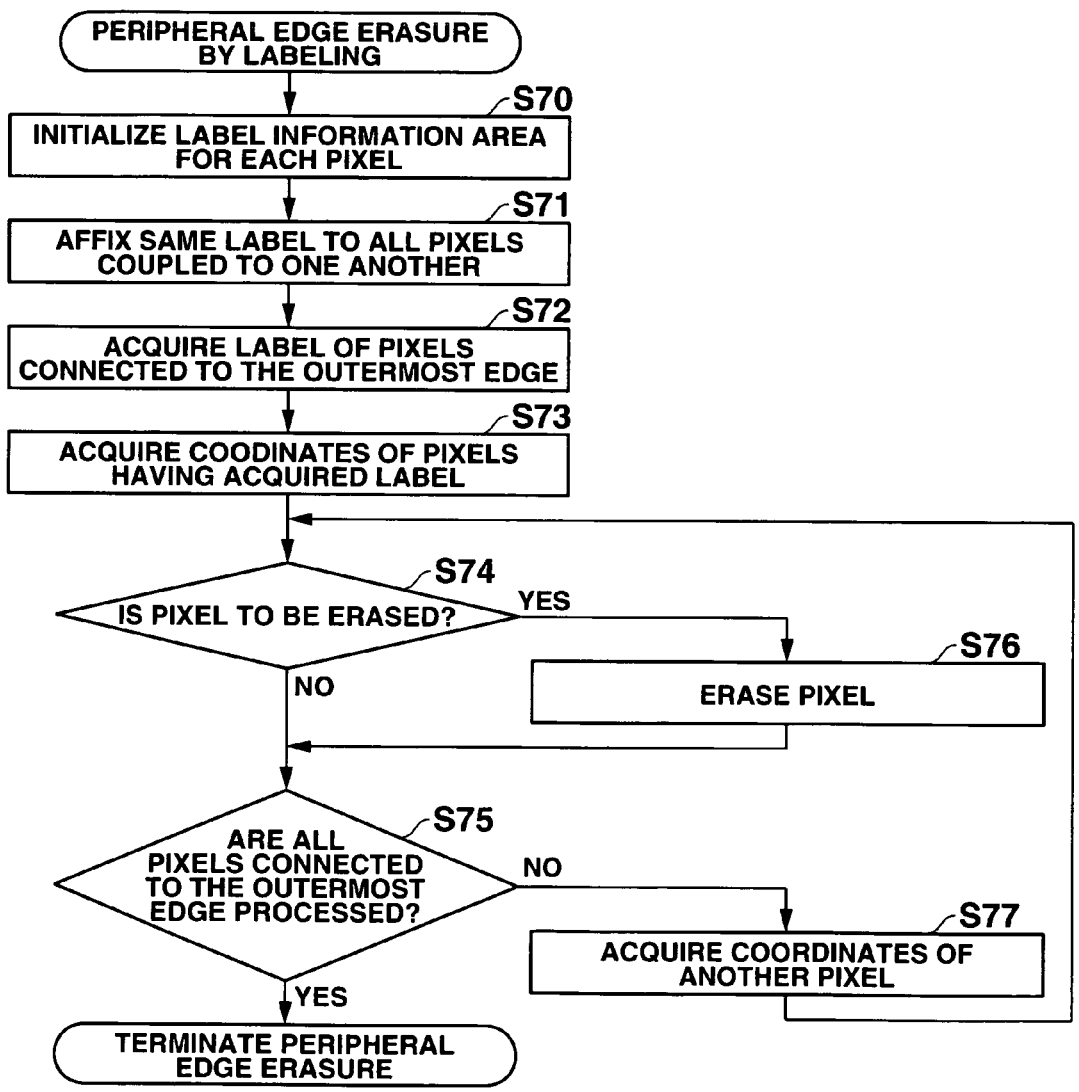
FIG. 16 is a flowchart of peripheral edge erasing processing by labeling according to the second embodiment.

The processing in steps S70 to S72 in FIG. 16 are basically the same as those in steps S60 to S62 in FIG. 11. Therefore, only steps S73 to S77 will be described.

In step S73, coordinates of pixels to which one of the labels obtained in step S72 is assigned are acquired with reference to, for example, the label information area. In the following step S74, it is determined whether or not the coordinates are coordinates to be objects for erasing (elimination). The coordinates to be objects of erasing are coordinates in which, for example, the x coordinate is an even number and the y coordinate is an odd number. When the coordinates are coordinates to be objects for erasing, the determination result is YES, and after those pixels are erased in step S76, the flow proceeds to step S75. Otherwise, the determination result is NO, and the flow proceeds to step S75.

In step S75, it is determined whether or not the partial erasing of the pixels to which one of the labels obtained in step S72 is assigned is completed. Next, when there are no pixels to be objects, the determination result is YES, and here, the flow is terminated. Otherwise, the determination result is NO, coordinates of the pixels to be next objects are acquired in step S77 in the same way as in step S73, and then, the flow returns to step S74.

Note that, in the second embodiment, the partial erasing of the edge contacting the outermost edge is performed before candidates for the edge are detected. However, after candidates are detected, erasing may be performed taking the detection result thereof into consideration.

In some cases, on an edge image, all or some of the four border lines on the top, bottom, left, and right of the desired photographic print image are connected to one another. When some of the border lines connected to one another contact the edge extending from the outermost edge, all the border lines are partially removed. However, in consideration of the result of detecting candidates, it is possible to perform partial erasing limited to a border line contacting the edge extending from the outermost edge. In this way, by limiting the border lines to be objects for erasing, it is possible to avoid a reduction in the number of votes in the other edges. This makes it possible to more certainly and precisely detect the edge of the desired photographic print image.

The image processing apparatus according to the above embodiments is applied to the image processing device 203 mounted on the portable photographing device 1. This is because it is possible to appropriately digitize the photographic print 3 more rapidly with less devices because the photographing device 1 has such an image processing device 203 mounted thereon. However, the image processing apparatus may be realized on a data processing device, such as a personal computer, which is different from a photographing device. In order to realize such an image processing apparatus, all or some of the programs for image processings stored in the code storage device 205 may be stored on storage media to be distributed. Or, those may be distributed via communication media constituting a network. In order to realize a photographing device including an image processing apparatus according to the present embodiments, they may be distributed along with the programs executed by the CPU 204.

What is claimed is:

1. An image processing apparatus comprising:
    an image capturing unit which captures an image, wherein the image is defined by outermost edges and includes a target object within the outermost edges;
    an edge detecting unit which detects edges existing within the outermost edges of the image captured by the image capturing unit;
    a weighting unit which performs weighting onto the edges detected by the edge detecting unit depending on whether or not the detected edges contact any of the outermost edges of the image, and which erases edges contacting the outermost edges from the detected edges;
    a straight edge line detecting unit which detects straight edge lines forming linear border lines of the target object based on edges of the detected edges remaining after erasure of the edges contacting the outermost edges by the weighting unit; and
    an area extracting unit which extracts from the image an area in which the target object exists based on the straight edge lines detected by the straight edge line detecting unit.

2. The image processing apparatus according to claim 1, wherein the area extracting unit performs at least one of a rotating operation and a transforming operation with respect to an image of the extracted area.

3. The image processing apparatus according to claim 1, wherein the area extracting unit comprises an area selecting unit which enables a user to select the extracted area.

4. The image processing apparatus according to claim 1, further comprising a color fading correction unit which performs color fading correction for correcting color fading of an image of the extracted area.

5. An image processing method comprising:
    capturing an image using a photographing device, wherein the image is defined by outermost edges and includes a target object within the outermost edges;
    detecting edges existing within the outermost edges of the captured image;
    performing weighting onto the detected edges depending on whether or not the detected edges contact any of the outermost edges of the image, and erasing edges contacting the outermost edges from the detected edges;
    detecting straight edge lines forming linear border lines of the target object based on edges of the detected edges remaining after erasure of the edges contacting the outermost edges; and
    extracting from the image an area in which the target object exists based on the detected straight edge lines.

6. The image processing method according to claim 5, further comprising at least one of rotating and transforming an image of the extracted area.

7. The image processing method according to claim 5, wherein the extracting comprises enabling a user to select the extracted area.

8. The image processing method according to claim 5, further comprising correcting color fading with respect to an image of the extracted area.

9. A non-transitory storage medium having stored thereon a computer program for controlling an image processing apparatus to perform functions comprising:
    detecting edges existing within an image which is captured by a photographing device, wherein the image is defined by outermost edges and includes a target object within the outermost edges;
    performing weighting onto the detected edges depending on whether or not the detected edges contact any of the outermost edges of the image, and erasing edges contacting the outermost edges from the detected edges;
    detecting straight edge lines forming linear border lines of the target object based on edges of the detected edges remaining after erasure of the edges contacting the outermost edges; and
    extracting from the image an area in which the target object exists based on the detected straight edge lines.

10. The non-transitory storage medium according to claim 9, further comprising at least one of rotating and transforming an image of the extracted area.

11. The non-transitory storage medium according to claim 9, wherein the extracting comprises enabling a user to select the extracted area.

12. The non-transitory storage medium according to claim 9, further comprising correcting color fading with respect to an image of the extracted area.

13. The image processing apparatus according to claim 1, wherein the target object comprises a photograph.

14. The image processing apparatus according to claim 1, wherein the straight edge detecting unit detects top and bottom linear border lines of the target object within a range of 45° to 135° and 225° to 315°, respectively.

15. The image processing apparatus according to claim 1, wherein the straight edge detecting unit detects left and right linear border lines of the target object within a range of 135° to 225° and 315° to 405°, respectively.

* * * * *